June 30, 1964   W. S. MESHEW   3,138,860
BATTERY ELEMENT BURNING METHOD AND MACHINE
Filed July 16, 1959   20 Sheets-Sheet 1
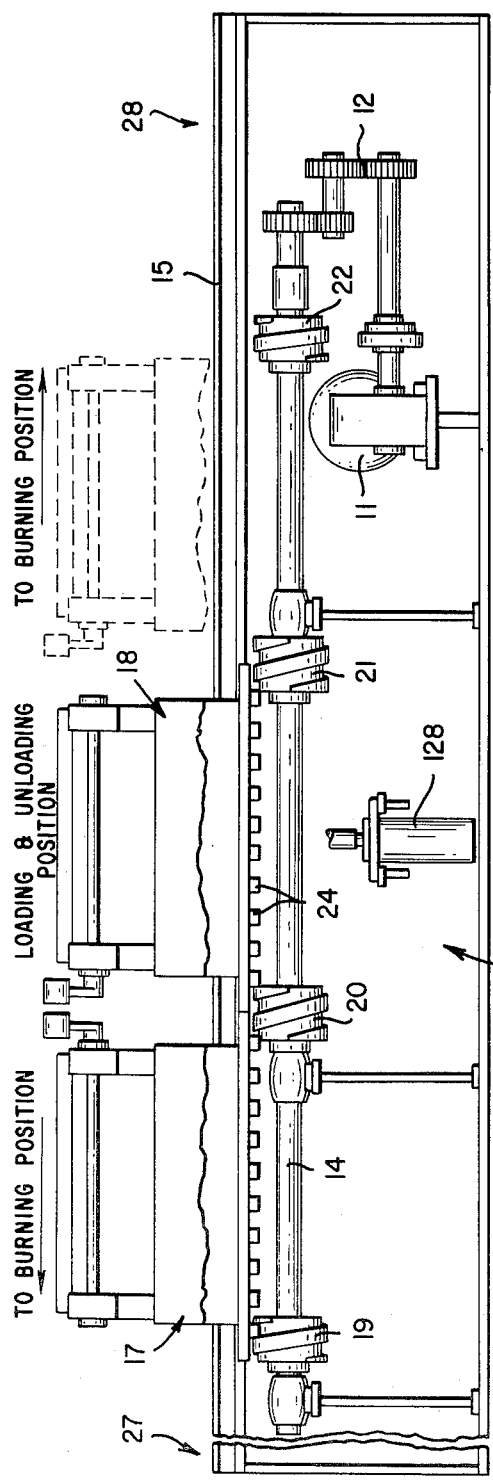
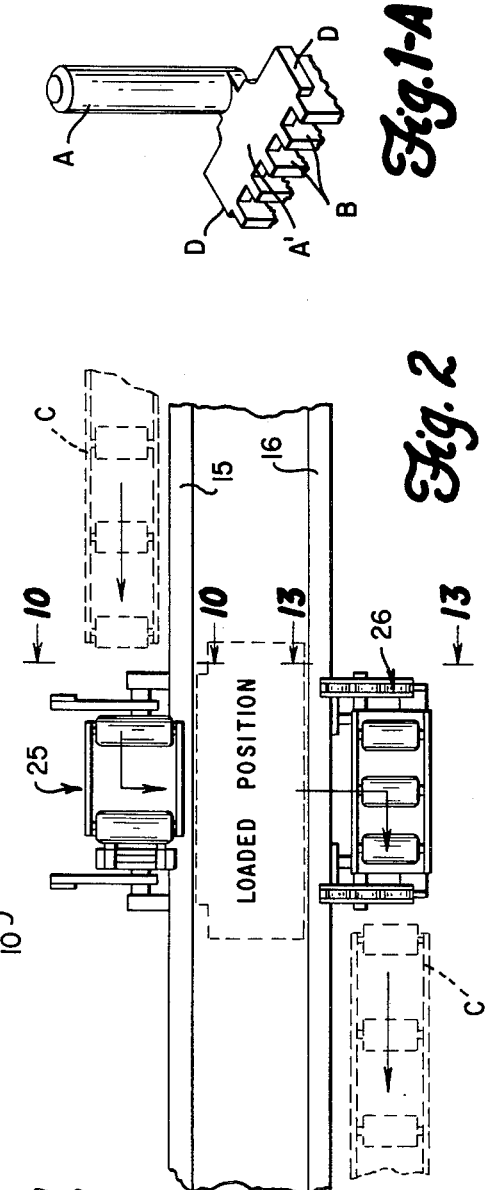
INVENTOR.
WARDER S. MESHEW
BY
Falvey, Southers & Stoltenberg
ATTORNEYS June 30, 1964   W. S. MESHEW   3,138,860
BATTERY ELEMENT BURNING METHOD AND MACHINE
Filed July 16, 1959   20 Sheets-Sheet 2

INVENTOR.
WARDER S. MESHEW
BY
Falvey, Souther & Stoltenberg
ATTORNEYS

June 30, 1964 W. S. MESHEW 3,138,860
BATTERY ELEMENT BURNING METHOD AND MACHINE
Filed July 16, 1959 20 Sheets-Sheet 5

INVENTOR.
WARDER S. MESHEW
BY
Falvey, Souther & Stoltenberg
ATTORNEYS

INVENTOR.
WARDER S. MESHEW

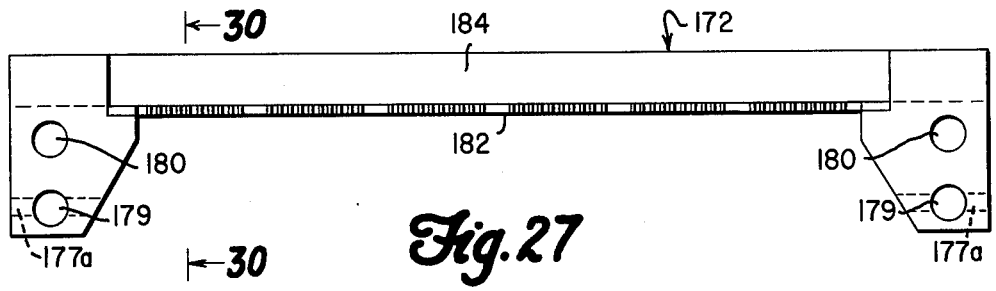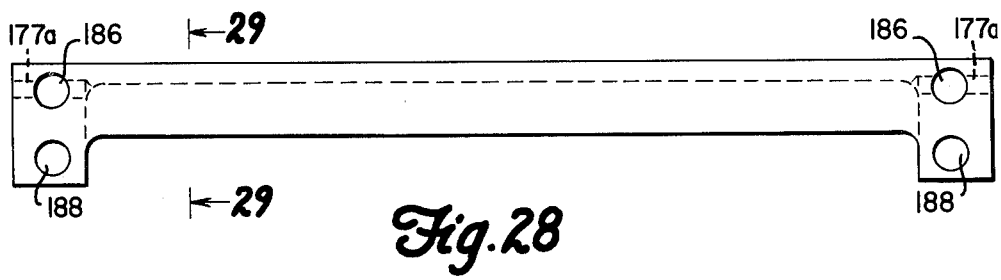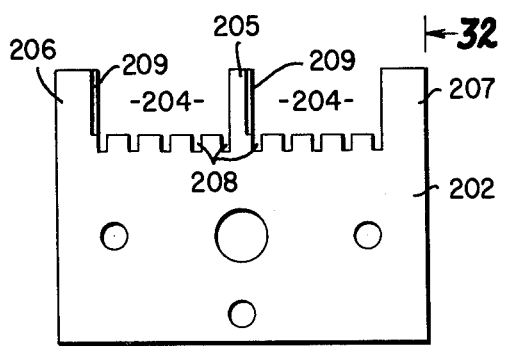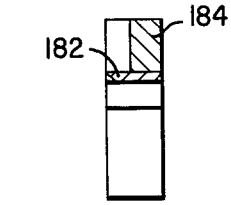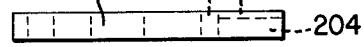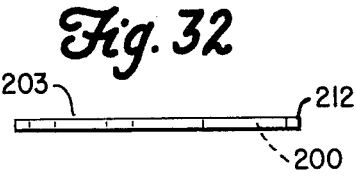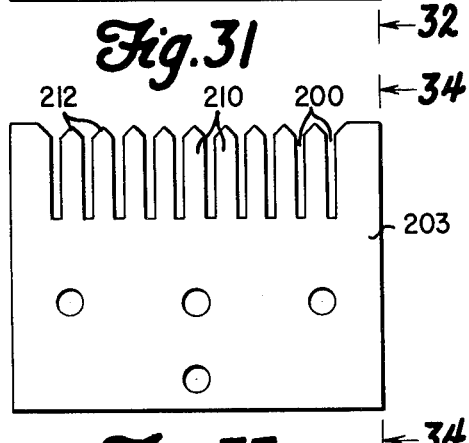

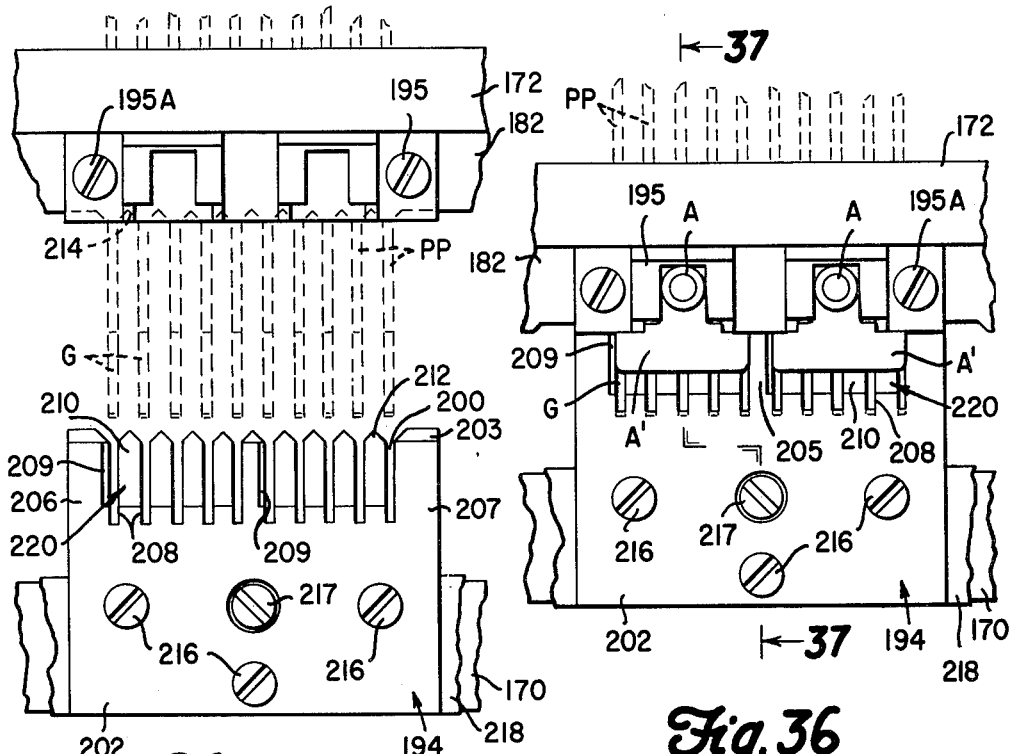
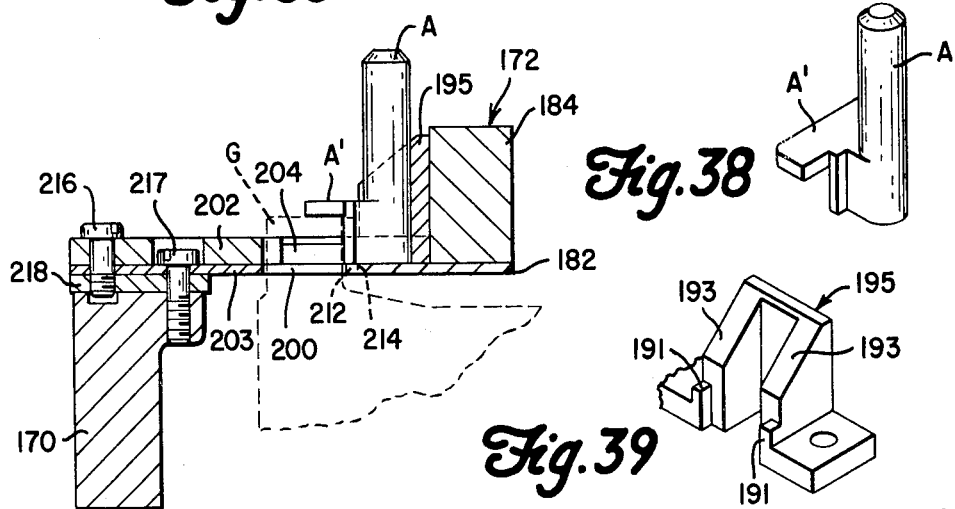

June 30, 1964  W. S. MESHEW  3,138,860
BATTERY ELEMENT BURNING METHOD AND MACHINE
Filed July 16, 1959  20 Sheets-Sheet 18

INVENTOR.
WARDER S. MESHEW
BY
Falvey, Souther & Stoltenberg
ATTORNEYS

June 30, 1964  W. S. MESHEW  3,138,860
BATTERY ELEMENT BURNING METHOD AND MACHINE
Filed July 16, 1959  20 Sheets-Sheet 19

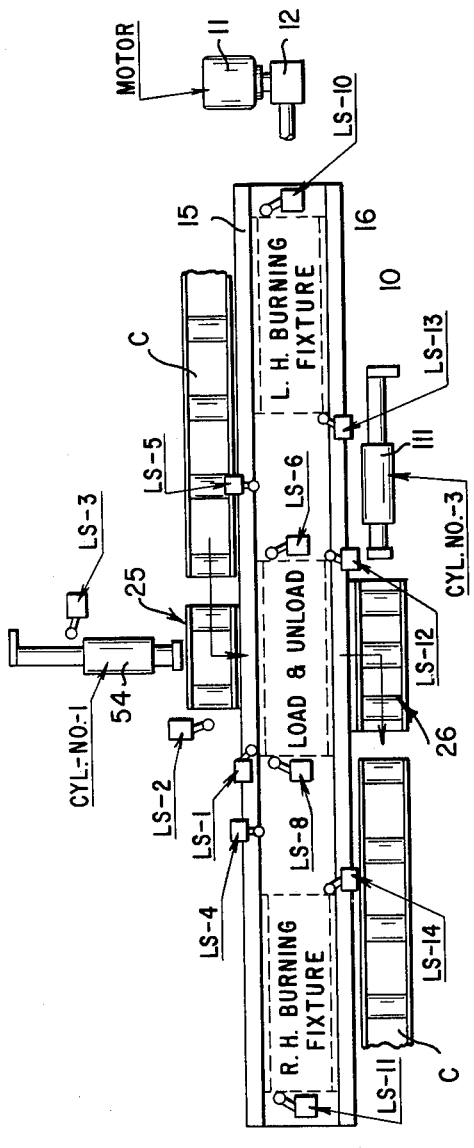

Fig.43

| SWITCH & CYLINDER OPERATION | |
|---|---|
| LS-1 | EXTENDS CYLS. NO.-1-2-3 WHEN FIXTURE IS OPEN |
| LS-2 | INTERLOCKS CYLS. LS-1 MAGAZINE OPERATED |
| LS-3 | RETRACTS CYLS. NO.-1-2-3 THROUGH TIMER |
| LS-4 | INTERLOCKS LS-8 OR 9 FIXTURE DOWN AND CLOSED |
| LS-5 | INTERLOCKS LS-6 OR 7 FIXTURE DOWN AND CLOSED |
| LS-6 | STOPS MOTOR IF LS-7 OR 9 ARE OPEN |
| LS-7 | FIXTURE DOWN – OPERATING POSITION |
| LS-8 | SAME AS LS-6 |
| LS-9 | SAME AS LS-7 |
| LS-10 | REVERSES MOTOR |
| LS-11 | REVERSES MOTOR |
| LS-12 | INTERLOCKS LS-1 WHEN FIXTURE IS CENTERED |
| LS-13 | LEFT BURNER ON 8 OFF |
| LS-14 | RIGHT BURNER ON 8 OFF |

Fig.44

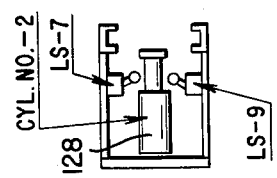

INVENTOR.
WARDER S. MESHEW
BY
Falvey, Souther & Stoltenberg
ATTORNEYS

June 30, 1964   W. S. MESHEW   3,138,860
BATTERY ELEMENT BURNING METHOD AND MACHINE
Filed July 16, 1959   20 Sheets-Sheet 20

INVENTOR.
WARDER S. MESHEW
BY
Falvey, Souther & Stoltenberg
ATTORNEYS

# United States Patent Office 3,138,860
Patented June 30, 1964

3,138,860
BATTERY ELEMENT BURNING METHOD AND MACHINE
Warder S. Meshew, Maumee, Ohio, assignor, by mesne assignments, to Ford Motor Company, a corporation of Delaware
Filed July 16, 1959, Ser. No. 827,480
11 Claims. (Cl. 29—471.1)

This invention relates to the manufacture of batteries, and more particularly to a method of and a machine for burning battery posts to the lugs of the assembled plates with the separators in position to form a battery cell element.

In the past, battery posts have been burned to the lugs of the plates of the cell elements by the use of a burning rack which held the parts in assembled relation while an operator manually performed the burning operation on the parts to integrally connect the battery post to the lugs by a melting together of the metals of the parts. This method of burning the elements was relatively slow and inefficient and also gave rise to improperly connected elements which would not become apparent until the battery had been placed in service in the field. Machines have also been used for this purpose but have been found to be ineffective for the purpose intended.

The present invention contemplates the provision of an effective method for automatically burning a battery post to the lugs of the plates of a cell element.

The invention further contemplates providing a machine which utilizes a novel method of burning battery posts to the lugs of the plates of a cell element which will effectually carry out the burning operation so as to make the machine suitable for use in a mass production line.

The invention further contemplates the provision of a machine which utilizes a pre-loaded magazine which is capable of being adjusted to hold various sizes of plates, so that the loaded magazine can be placed in a universal fixture which is suitable for use with many different sizes of plates used in the various sizes of batteries manufactured for use with automotive vehicles.

It is, therefore, a principal object of this invention to provide a method of burning battery posts to the lugs of the plates forming a cell element which is suitable for use on a mass production line and is capable of being carried out in connection with all sizes of plates which are to be used in batteries having different capacities or different dimensions.

It is a further object of this invention to provide a machine utilizing a novel method of burning battery cell elements wherein a magazine is provided which is capable of being preloaded with plates so that they are held in operative relation, including separators between the plates; the loaded magazine is then positioned in a universal fixture which will provide a holding means for a battery post to be burned to the lugs, and at the same time, provide a removable mold cooperating with the lugs and the superposed battery post so that the burning operation can be carried forward by causing the assembly to move under suitable jets of flame, a puddling device being also provided to cooperate with the magazine and universal fixture at a time when the metal is molten in the molds for the purpose of breaking down any inclusions or oxide barriers which may be found in the molten metal.

It is a further object of this invention to provide a method of and a machine for burning battery plates to both intermediate and terminal posts which is suitable for use in a mass production line which utilizes a magazine which is capable of being preloaded and is also adjustable to fit all required sizes of battery plates to cooperate with a universal fixture to hold the posts in position with reference to the lugs and provide a removable and adjustable mold element so that the machine can perform burning operations to affix battery posts to the lugs of the plates forming a cell element for all sizes of batteries and all capacities which are required to be made in the mass production line.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters desginate corresponding parts in the several views.

Referring to the drawings:
FIG. 1 is a schematic view, partly in section, showing the general arrangement of the main features of this machine;
FIG. 1-A is an isometric view showing a portion of the assembled element this machine produces;
FIG. 2 is a schematic plan view showing the machine positioned in an assembly-line system;
FIG. 3 is a side elevation, partly broken away, of a plate element magazine;
FIG. 4 is a plan view taken on line 4—4 of FIG. 3;
FIG. 5 is an isometric view showing a rack assembly to be placed in the bottom of the magazine;
FIG. 6 is an end elevation taken on line 6—6 of FIG. 4;
FIG. 7 is a sectional view taken on line 7—7 of FIG. 4;
FIG. 8 is a section longitudinally through a compartment divider;
FIG. 9 is a longitudinal section through a partition wall between compartments;
FIG. 10 is an end view taken on line 10—10 of FIG. 2 showing the machine-loading mechanism in one position;
FIG. 11 is a similar view of FIG. 10 in a second working position;
FIG. 12 is an elevation taken on line 12—12 of FIG. 10;
FIG. 13 is an end view of the unloading mechanism taken on line 13—13 of FIG. 2;
FIG. 14 is an elevation taken on line 14—14 of FIG. 13;
FIG. 15 is a side elevation of a master fixture removed from the machine;
FIG. 16 is an end elevation partly in section showing a master fixture in the machine;
FIG. 17 is a plan view taken on line 17—17 of FIG. 16;
FIG. 18 is a plan view taken on line 18—18 of FIG. 16;
FIG. 19 is a vertical section through the machine base showing an air cylinder to lift the master fixtures;
FIG. 20 is an elevational view taken on line 20—20 of FIG. 19;
FIG. 21 is a plan view taken on line 21—21 of FIG. 19;
FIG. 22 is an enlarged plan view of a detail of a master fixture;
FIG. 23 is a section taken on line 23—23 of FIG. 22;
FIG. 24 is an elevational view taken on line 24—24 of FIG. 15;
FIG. 25 is a plan view of a rapid traverse cam;
FIG. 26 is a plan view of a slow traverse feed cam;

FIG. 27 is a plan view of a battery post holding bar of the master fixture;

FIG. 28 is a view of a comb mounting bar of the master fixture;

FIG. 29 is a view taken on line 29—29 of FIG. 28;

FIG. 30 is a view taken on line 30—30 of FIG. 27;

FIG. 31 is a plan view of a mold cavity plate;

FIG. 32 is a view taken on line 32—32 of FIG. 31;

FIG. 33 is a plan view of a comb plate;

FIG. 34 is a view taken on line 34—34 of FIG. 33;

FIG. 35 is a plan view showing the mold assembly in open position;

FIG. 36 is a plan view showing the mold assembly in closed position with the battery posts in place;

FIG. 37 is a sectional elevation taken on line 37—37 of FIG. 36;

FIG. 38 is an isometric view of a battery post designed for an automatic burning method;

FIG. 39 is an isometric view of a battery post holder which is part of the mold assembly of the master fixture;

FIG. 43 is a schematic view showing the approximate locations of the automatic switches and air cylinders;

FIG. 44 is a descriptive list of the electrical switches; and

Figure 3:
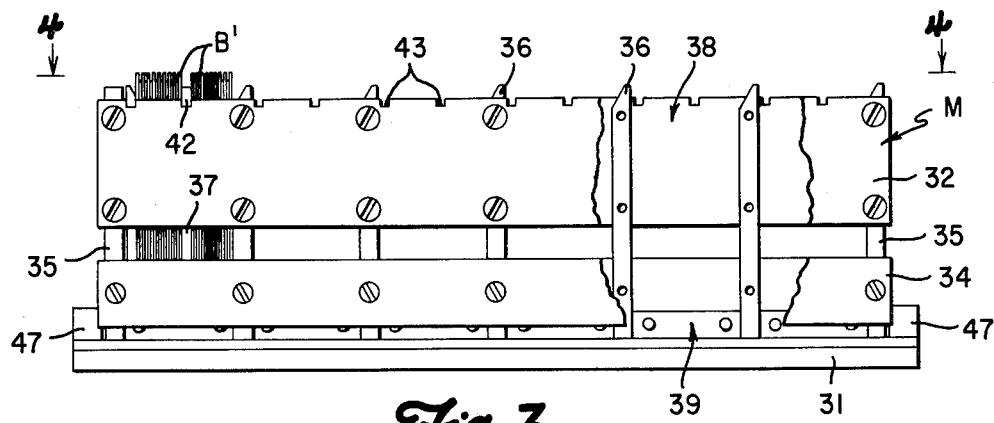

A machine embodying the invention, as shown in FIGS. 1 and 2, is provided with a base portion 10, inside of which is mounted a reversible electric motor 11 connected through a train of gears 12 to a longitudinal rotating shaft 14 suitably journaled on the base portion. Two longitudinal tracks 15 and 16 are provided on the top of base 10 running substantially the length of the machine, which support and guide two magazine-holding master fixtures 17 and 18 that provide the necessary mold facilities for burning battery posts A to battery plate elements B (FIG. 1A). Feed cams 19, 20, 21 and 22, resembling a threaded drum, are mounted in fixed position on the rotating longitudinally-extending shaft 14 and drive a plurality of cam rollers or cam followers 24 mounted in rack formation on the bottom of fixtures 17 and 18 causing the fixtures to travel back and forth through loading, unloading and burning positions, depending on the controlled direction of rotation of the shaft 14. The loading and unloading conveyor mechanisms are indicated at 25 and 26 respectively (FIG. 2), the burning positions being at 27 and 28 at the ends of the longitudinal track.

The machine is adapted to be placed in a production conveyor system whereby magazine members, filled with a plurality of battery plate cell elements B' are fed to one side of the machine where a single magazine member is mounted in one of the universal fixtures 17 and 18 and provided with suitable precast posts positioned on the lugs of the cell plates of an element in cooperative relation with mold facilities including combs forming a part of the fixture. With the parts held in fixed position in the fixture, the fixture and its magazine is moved along the rails by the cams on the shaft 14 to one end or the other for processing by passing under suitable jet burners.

After the burning step, the burners are shut off in timed sequence and the direction of movement of the processed fixture with its magazine is reversed to return it to a central position where the magazine is removed from the machine to the opposite side onto the conveyor 26. This is accomplished by pushing a new magazine into the fixture, displacing the one just processed. With two fixtures available, one fixture may be loaded while the second is being processed by the burners at one end of the machine which also allows the second one to be unloaded and again loaded with a new magazine while the first fixture and its magazine is being processed. For a more clear understanding of the machine, the different operations and their related parts starting with the magazine will be described.

*The Magazine*

Figure 4:
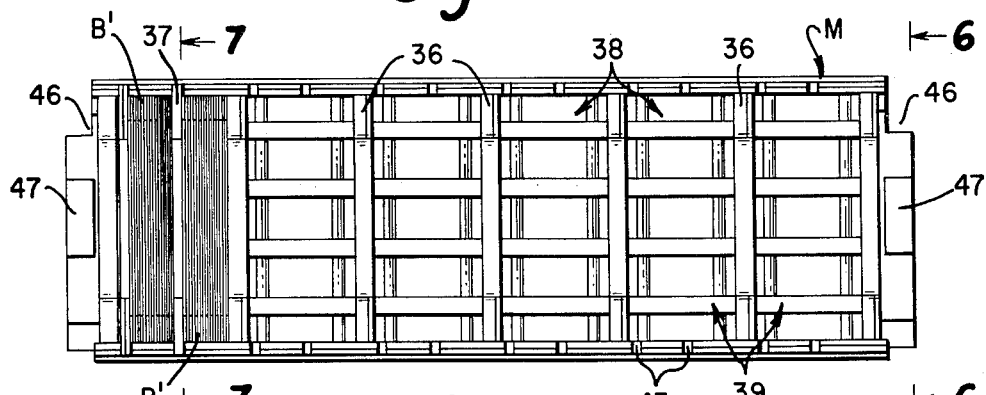
Figure 5:
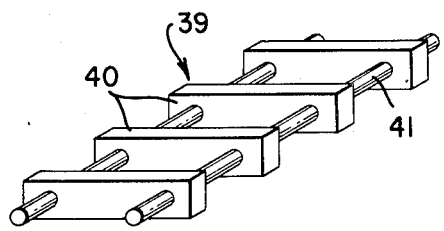
Figure 6:
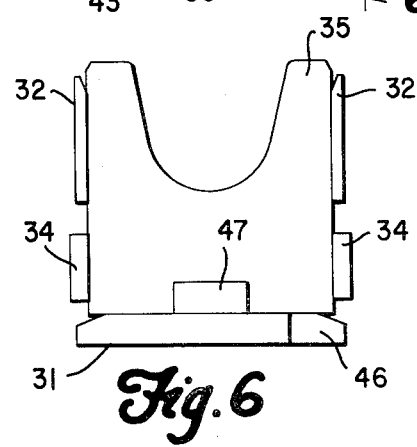

Referring to FIGS. 3 and 4, a magazine structure M is shown having a base 31, two upper, relatively wide side panels 32, two lower, relatively narrow side members 34 and end walls 35. The box-like configuration is divided into a plurality of compartments 38 by partition members 36 which are suitably affixed to the side panels. As shown in the drawings, each compartment holds two battery cell units B', separated by a removable divider member 37, although the invention is not to be limited to the number of cells units in a compartment or the number of compartments. The bottom of each compartment is provided with a rack 39 (FIG. 5) consisting of simple rectangular metal bars 40 held in spaced relation by metal dowels 41, the rack acting as the spacing medium to accommodate plates of different height for various battery sizes.

Figure 7:
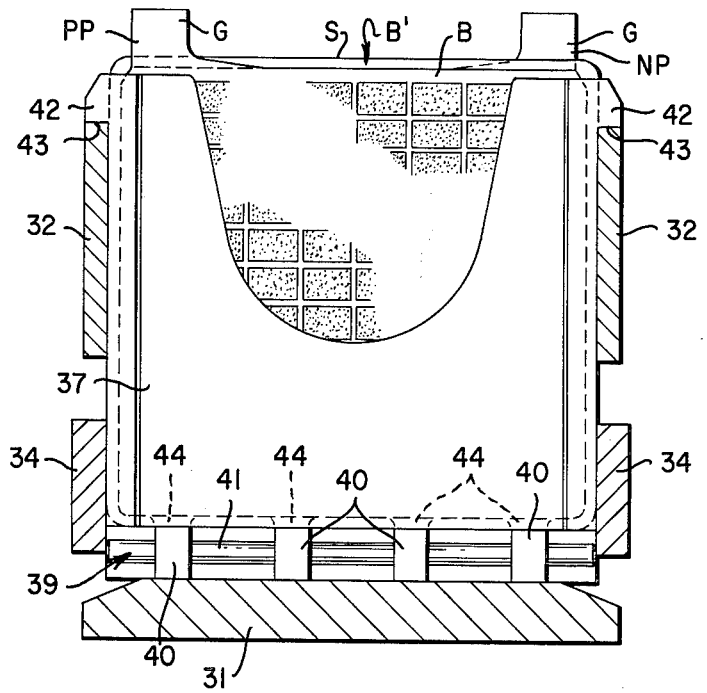

Returning to dividers 37, as seen in FIG. 7, hanger projections 42 are provided at the upper corners of dividers 37 to cooperate with spaced slots 43 in the side members 32, FIG. 3, to maintain a cell unit B' in assembled relation for the burning step. The slots 43 and the cooperating dividers 37 can be spaced to accommodate cell units having plates of different thickness and/or cell units having more or less plates per unit. In the present device, a cell element has been selected, including a suitable magazine which will hold twelve cell units, each unit consisting of nine plates, which will furnish the number of components needed for two complete, nine-plate, six-cell batteries. All of the plates and the separators are pre-loaded into the magazine with their connector lugs projecting upwardly above the level of the sides 35, as seen in FIGS. 3 and 7.

In the manufacture of batteries on a large production line, it is desirable to be able to change the line from using one size plate to another to build different size batteries without having the line shut down for an unreasonable length of time. By using an adjustable magazine such as the one disclosed, an operator can quickly remove the existing racks 39 of a desired height and substitute a different set of racks having a different height, without having to change the magazine, thereby reducing the cost of providing additional magazines.

As seen in FIG. 7, the rack 39 rests on the base member 31 within the lower side members 34. The bars 40 are spaced on the dowels 41 so that the projections or feet 44 on the bottom of the positive and negative plates PP and NP rest upon alternate bars when the plates are in operative position. The battery separators S also rest on them. As is common practice, the battery plates are provided with two projections or feet 44; the feet on the negative and positive plates are alternately spaced so that when the plates are assembled in a complete cell unit, the feet 44 have a staggered relationship between every other plate, thereby lessening the chances of a short circuit during the life of the battery. If plates of a different height are to be assembled, the operator quickly changes to a suitable rack size having bars of the required height (from base 31 to plate feet 44) and the magazine is again ready for use. The racks rest on the base 31 by gravity.

The base 31 of the magazine M is provided with notched corners 46 (FIG. 4) which cooperate with a stop mechanism to control its movement by a conveyor, which will be explained more in detail hereinafter. Also provided on the base 31 are blocks 47 at each end of the magazine which cooperate with a holding and locating means in connection with a universal burning fixture 17 or 18, all of which will be explained more in detail hereinafter.

Figure 8:
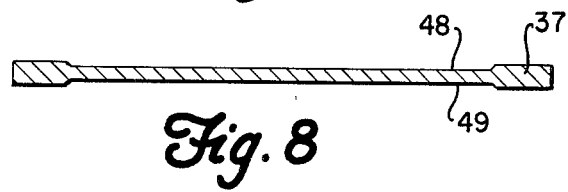
Figure 9:

To facilitate the loading of plates of the cell units, all of the magazine compartment partitions 36 and the compartment dividers 37 are undercut. This additional space is necessary to allow loading of cell units wherein, occasionally, a plate is included having an unintentional bowed configuration resulting in additional thickness to the cell unit. A horizontal section taken through the lower portion of a typical compartment divider 37 is shown in FIG. 8, where both sides are undercut or indented as at 48 and 49. In FIG. 9, a similar view of a compartment wall or partition 36 is shown having one side indented as at 50. In cases where plates having a different thickness are to be assembled, or a larger number of plates are to be used, a magazine having the same general configuration and outside dimensions but with a different compartment spacing, could be used without any major change to the machine.

The Loading Mechanism for the Universal Fixture

Figure 10:
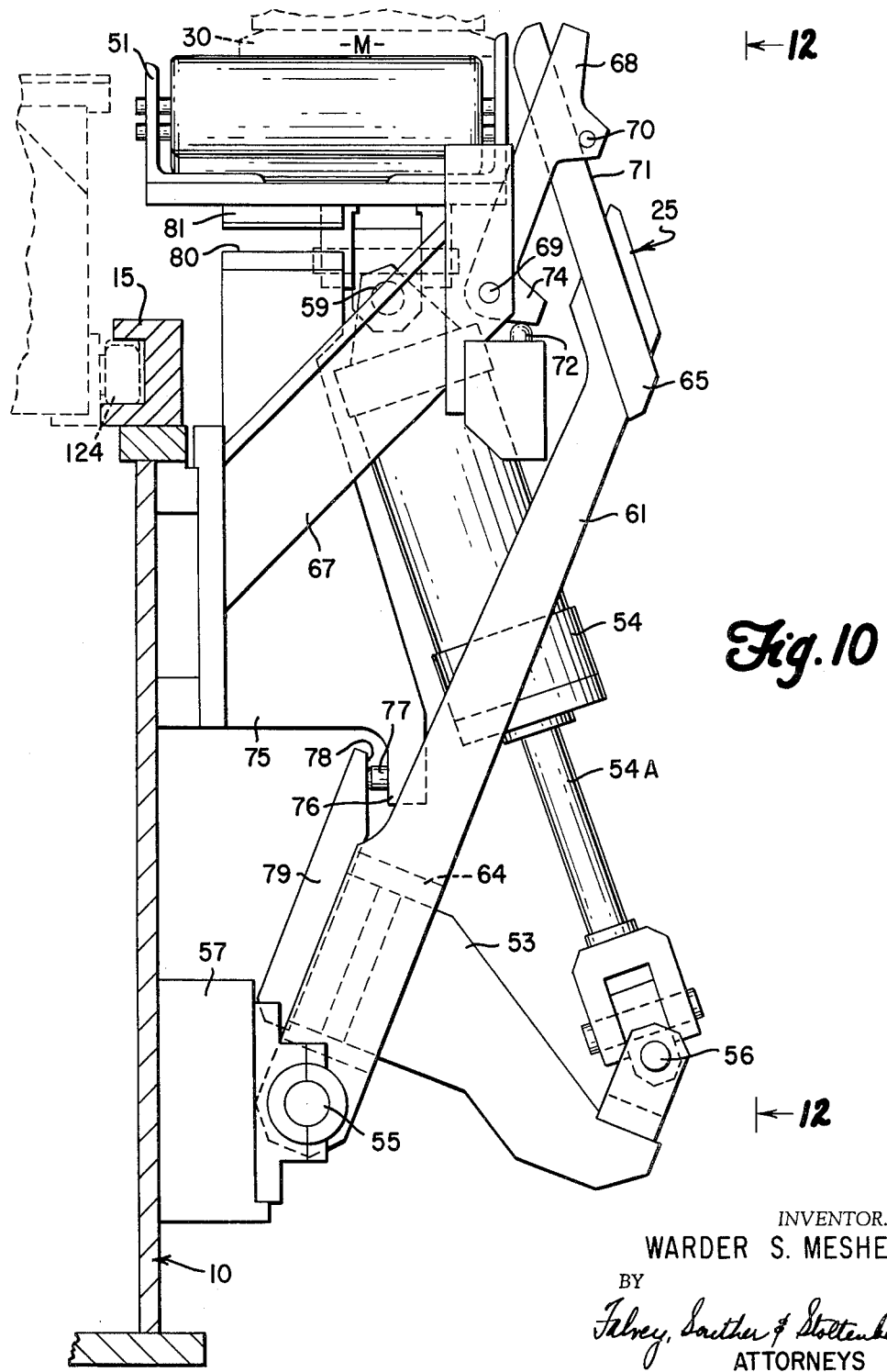
Figure 11:
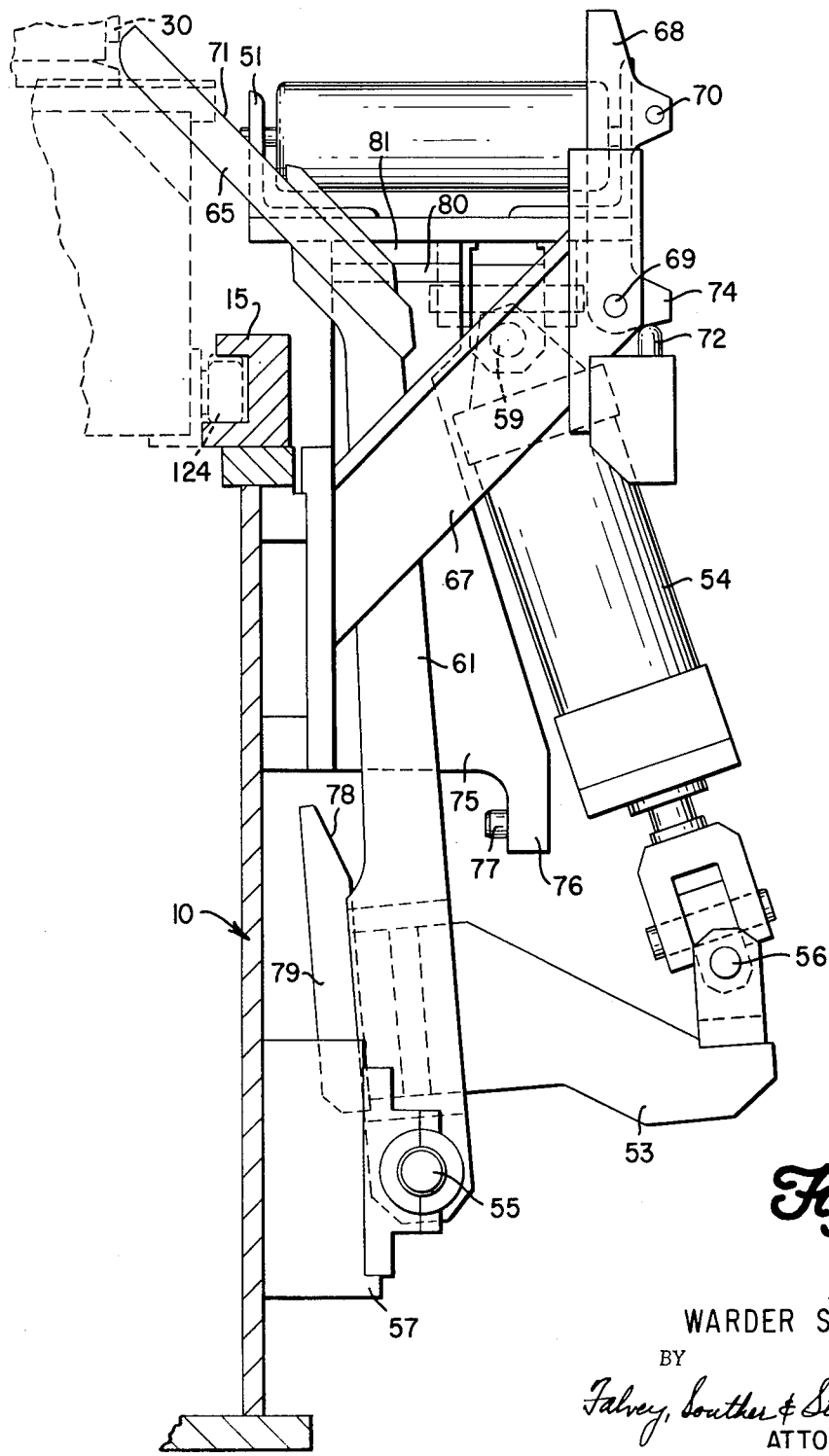
Figure 12:
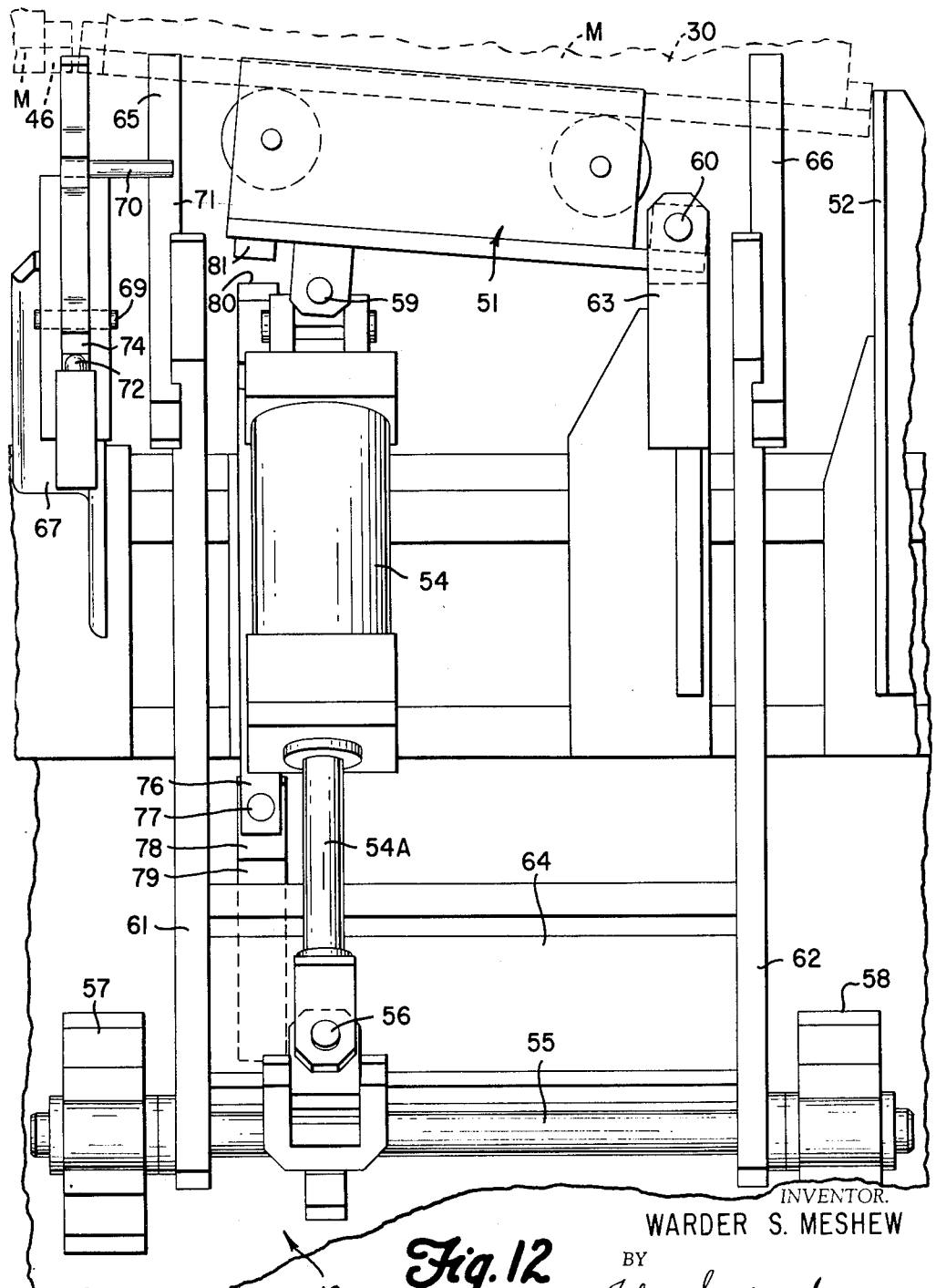

The magazines, loaded by an operator with cell elements, are moved along a roller type conveyor system C until they are stopped by the burning-machine-loading-mechanism 25. The loading mechanism is mounted on the outside of the machine base 10 and located substantially in the center of the machine. The details and operation of same, as shown in FIGS. 10, 11, and 12, will now be described.

Magazines M are moved to the loading position by a simple conveyor system wherein each magazine pushes the one in front of it along the conveyor. As a magazine 30 is pushed into loading position, it is guided along on a short two-roller conveyor mechanism 51 until one end of the magazine base 31 contacts a stop member 52. As seen in FIG. 12, by reason of the fact that the magazines push each other, the moment a magazine contacts stop member 52, the magazines following will be held in place on the conveyor system until the first magazine is loaded into the machine, after which another magazine may be pushed into place. When the first magazine is pushed into place, it actuates a limit switch LS–2 (FIG. 43), mounted in any convenient location, which is a necessary preliminary step in the sequential operation of the machine. In the event a magazine fails to reach the loading position for various reasons, and the switch LS–2 is not actuated, the machine being automatic, finishes its sequence of operations with the magazines already in process, and then stops. Various other control switches are used on the machine, as shown in FIG. 43, and will be explained later in the description.

When switch LS–2 is actuated, a system of air valves is activated, controlling the operation of air cylinder 54. As seen in the drawings, particularly FIGS. 10 and 12, the action of cylinder 54 is transmitted to a longitudinal shaft 55 through the piston rod 54A to a universal pivot 56 on the end of crank arm 53, shaft 55 being pivotally mounted in bearing blocks 57 and 58 mounted near the bottom of machine base 10. The cylinder 54 is connected at its upper end to another universal pivot 59 affixed to the bottom side and at one end of the roller conveyor structure 51. The other end of structure 51 is mounted on a pivot 60 affixed to a stationary bracket 63 also mounted on the machine base 10.

Affixed to the shaft 55 are two upwardly-extending pusher arms 61 and 62, the arms being held in rigid parallel relation by the use of a cross bar 64, which also mounts the crank arm 53 (FIG. 10) which transmits the action of cylinder 54 to pusher arms 61 and 62. The top ends of arms 61 and 62 are provided with angular extensions 65 and 66 which are adjustably mounted thereon. Referring to FIGS. 10 and 11, the arms and their extensions 65 and 66 are assembled in an angular relation allowing operating clearance with other machine parts when pushing a magazine 30 from the conveyor portion 51 by contacting the adjacent side of its base.

Figure 15:
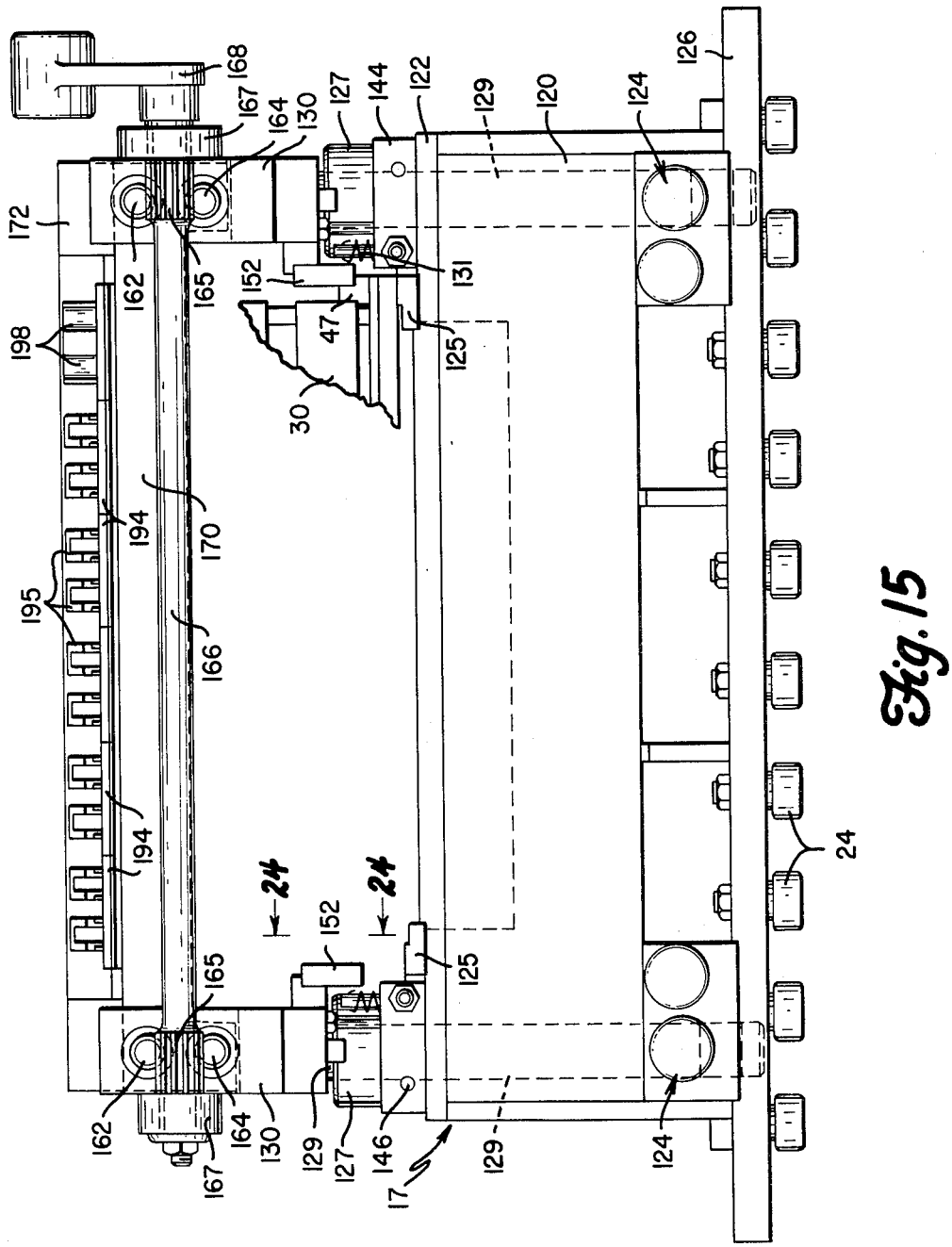

A magazine feed stop mechanism 68 holds the magazine M following on the conveyor system C (FIG. 2) while the magazine 30 on the member 51 is being loaded into a universal fixture shown in FIG. 15, thereby preventing jamming of the machine. The feed stop mechanism 68, which is a bar, is mounted on a bracket structure 67 affixed to the frame 10. The bar 68 (FIGS. 10, 11 and 12) is pivoted on its lower end on pivot pin 69 positioned in bracket 67 and is provided near its upper end with a camming pin 70 projecting laterally to cooperate with extension 65. Pin 70 is long enough to be contacted and controlled by the oblique outer surface 71 of arm extension 65. Directly below bar 68 and mounted on the bracket 67, a spring-urged plunger 72 is provided, which bears against the lower surface of an integral right-angle projection 74 of bar 68, urging bar 68 in a counter-clockwise direction about its pivot 69, but is overcontrolled by the action of the extension 65 which moves the bar 68 in the opposite direction by its return stroke.

A plate 75, FIG. 10, mounted edgewise and vertically on the side of machine base 10, has an integral depending portion 76 provided with a stop button 77 to cooperate with a beveled surface 78 at the top of bar 79, which is mounted on the cross bar 64 connecting arms 61 and 62 and also mounting the crank arm 53. As can be seen in the drawings, the contacting of surface 78 and button 77 prevents the cylinder 54 from moving the pusher arms 61 and 62 beyond a given position. The top of plate 75 provides a stop surface 80 directly in line and cooperating with a member 81 mounted on the bottom of roller structure 51. The roller mechanism 51, as seen in FIG. 12, is mounted on an angle to insure that the magazine 30 moves against stop 52 by the action of gravity.

In the operation of the loading mechanism, when cylinder 54 is actuated by fluid pressure to move the piston rod 54A upwardly (FIG. 10), the distance between pivots 56 and 59 is shortened. This causes the member 51 to be pulled down first about the pivot 60 until stop member 81 contacts fixed surface 80 on the plate 75. The magazine 30, resting against stop 52, with the member 51 being in a horizontal position, is now in aligned position to be pushed into the universal fixture in central position in the machine.

When the members 80 and 81 are in contact, a definite anchoring position for pivot 59 has been established, and additional movement in cylinder 54 will cause the piston rod to move the pivot 56 and crank arm 53. Crank arm 53, being connected to the cross bar 64, causes arms 61 and 62, and shaft 55 to rotate counter-clockwise, as seen in FIGS. 10 and 11. When arms 61 and 62 are rotated, extensions 65 and 66 contact the lower part of magazine 30, pushing it from the conveyor structure 51 into place in the fixture (FIG. 11). Also, when extension 65 has moved to the left (FIG. 12), it clears the way for the bar 68 with its pin 70 to be rotated about its pivot 69 through the action of spring-biased plunger 72, to move the end of the bar 68 into the corner notch 46 of magazine base 31 (FIG. 12), to prevent further movement of the magazines on the conveyor system C until the loading mechanism has returned to its original position. A stop mechanism is provided in the machine to prevent pushing the magazine 30 into the fixture too far. The details of this stop mechanism will be described later.

In the reverse operation of the loading mechanism to return to its original position, fluid pressure is applied to the opposite end of the cylinder 54 to move the piston rod 54A in the opposite or downward direction, which moves the crank arm 53 downward until the bar 79 (FIG. 10) with its beveled edge 78 contacts stop button 77 creating a definite stop position. When the crank arm 53 has reached a definite stop, piston rod 54A will continue to move, pushing one end of roller mechanism 51 up in line with the conveyor system C about the pivot 60. When the pusher arms 61 and 62 are rotated clockwise by the downward movement of the crank arm 53, the extension 65 provides a camming action on pin 70 by its oblique surface 71, which retracts bar 68 out of notch 46 against the action of the spring-urged plunger 72, allowing another magazine to be pushed into machine-loading position on the member 51.

The Unloading Mechanism for the Universal Fixture

After a magazine has been processed and carried by the universal fixture through the burning process, to be described later, and returned to the center of the machine, it must be unloaded from the fixture, making room to load another unprocessed magazine therein for another cycle. An unloading and conveyor mechanism 26 (FIG. 2) has been provided on the opposite side of the machine directly across from the loading mechanism 25, already described. The unloading operation is accomplished simultaneously with the loading and by the same pusher system inasmuch as the magazine being loaded into the fixture pushes the processed magazine out onto the conveyor or unloading mechanism 26.

Figure 13:
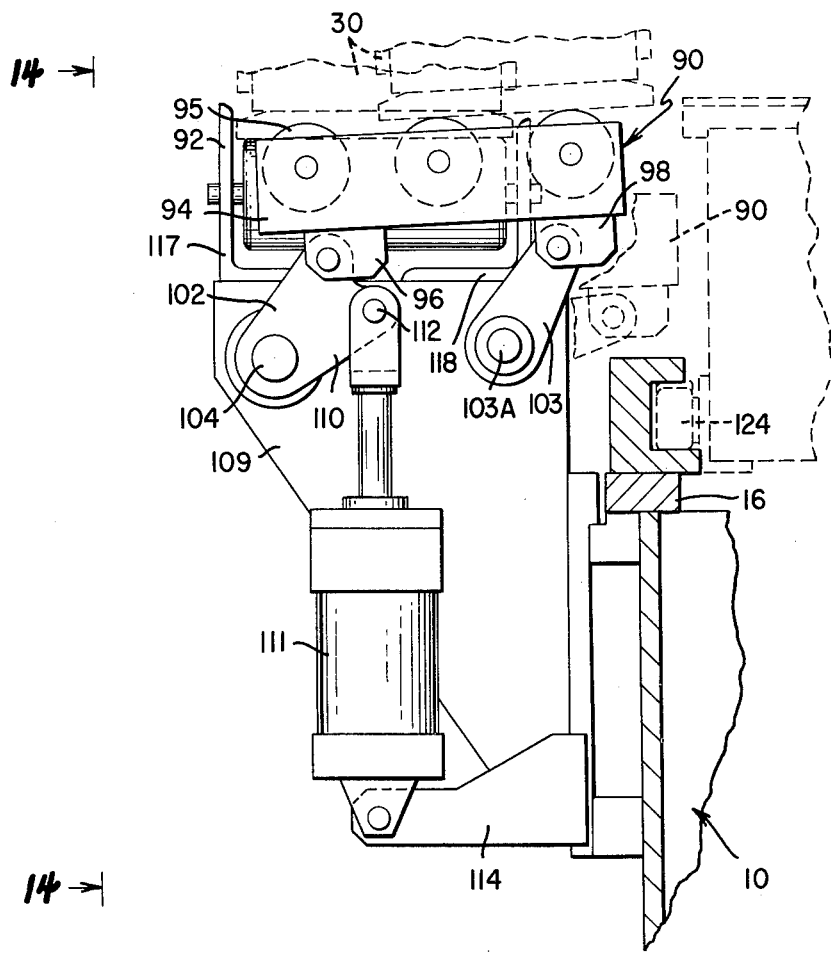
Figure 14:
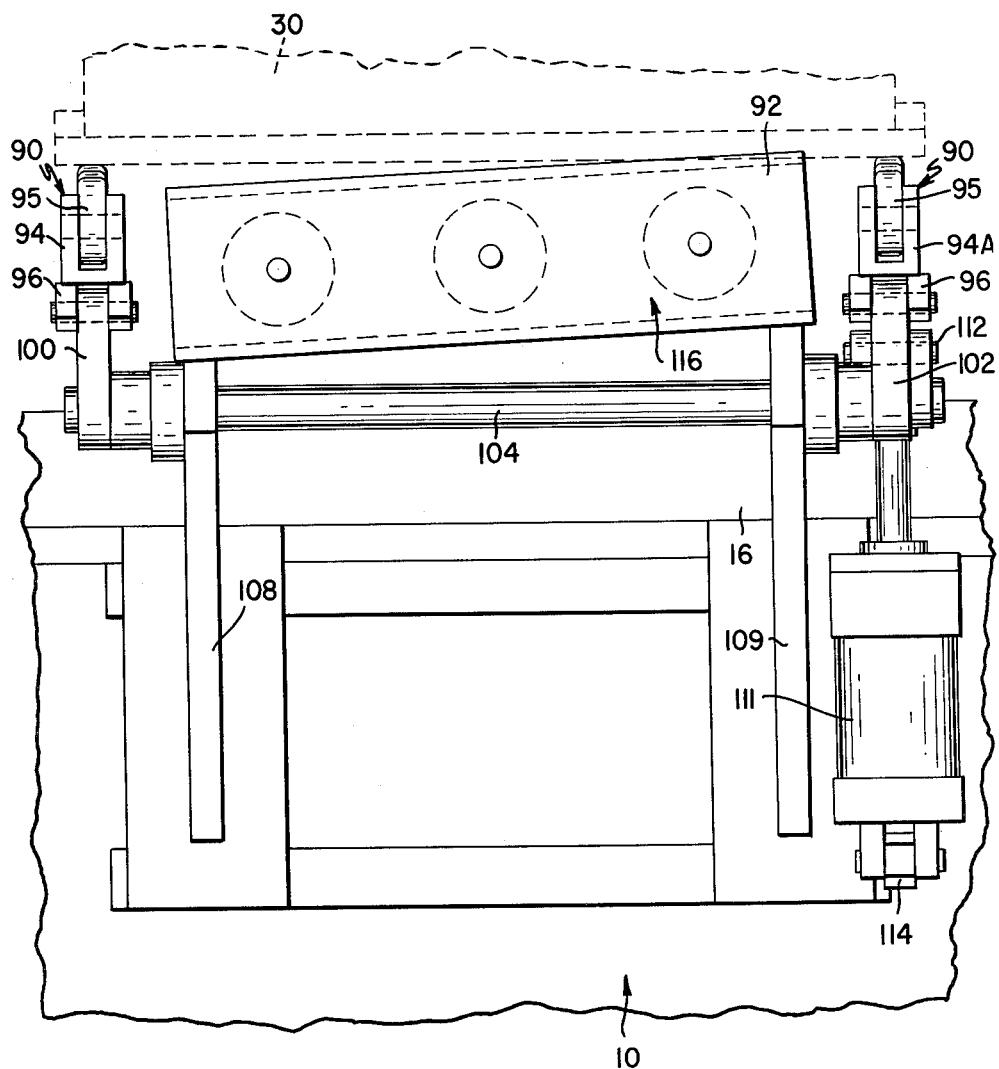

The unloading mechanism 26 can be described as a two-direction conveyor platform since the mechanism has two systems of rollers capable of selective operation at ninety degrees to each other to get the processed magazine unloaded from the fixture and in suitable position and started onto the production conveyor system C. To be more specific, as a processed magazine 30 is pushed out of the fixture by the pusher arms 61 and 62 moving a new unprocessed magazine into the fixture from the far side, it glides onto two sets of spaced rollers 90, which have been moved up into operative position by a means to be described until it reaches a stop member 92 (FIGS. 13 and 14). The roller sets 90 are mounted in spaced parallel relation, capable of movement together in a vertical direction, and also are given a slight inclination away from the machine, allowing gravity to move the processed magazine 30 against the stop 92. The two roller sets 90 are constructed of channels 94 and 94A, each having mounted therein three freely rotatable rollers 95, suitably journaled on fixed pins, each channel being provided with two sets of lugs 96 and 98 on its bottom by which the sets of rollers are movably mounted for downward parallel movement at selected times to transfer the magazine to the other set of rollers (FIG. 13).

Facing the unloading mechanism, as viewed in FIG. 14, the lug 96 of channel 94 is pivotally mounted on a movable crank arm 100 affixed to the left end of a transverse shaft 104. Shaft 104 is journaled in suitable bearings mounted in vertical plates 108 and 109 affixed on the frame 10 in any suitable manner. At the opposite end of the shaft 104 another similar crank arm 102 is affixed (FIG. 13), having an integral projection 110 connected by a pivot 112 to the end of a piston rod of an air-operated cylinder 111. The lower end of cylinder 111 is pivotally anchored to a bracket 114 mounted on the machine base 10. Crank arms 100 and 102 are both affixed on shaft 104, allowing the action of arm 102 by the piston rod of the cylinder 111 to be transmitted to arm 100.

Behind crank arms 100 and 102 are two identical arms 103 pivotally attached to lugs 98 at their upper ends (FIG. 13), each being pivotally mounted at their lower ends on fixed pins 103A positioned in plates 108 and 109. The pivot connections 103A of arms 103 in plates 108 and 109 are in a horizontal plane located slightly higher than the plane of shaft 104, thereby providing for parallel movement of the roller sets 90 as they are moved upwardly to operative position, and also provide the inclination necessary for movement of the magazine 30 against the stop 92.

A short three-roller conveyor mechanism 116 is mounted on the top side of plates 108 and 109 by two spaced angle irons 117 and 118 having three freely rotatable rollers mounted between their upstanding portions. The upper portion of the outside angle iron 117 provides the stop 92, already mentioned, and also provides a guiding means when the processed magazines move toward the conveyor C (FIG. 2). Referring to FIG. 14, the conveyor 116 is affixed to the tops of plates 108 and 109, as shown, and it will be noted that plate 108 is shorter than plate 109, which provides a downward slope toward and in line with the production conveyor system C, causing the magazines 30 to move onto the conveyor system by the force of gravity.

In the operation of the unloading mechanism, after a magazine 30 is processed by going through the burning step, it is pushed out of the universal fixture onto rollers 95 until it reaches stop 92, the magazine 30 then resting in a horizontal position longitudinally disposed with reference to the machine, and also disposed above conveyor 116. The moment magazine 30 reaches this position, air cylinder 111 is automatically activated by the actuation of switch LS–3 and timers. When air cylinder 111 is activated, the crank arm 102 is moved by the piston rod also moving shaft 104 and crank arm 100 on its opposite end, which causes the roller sets 90, as viewed in FIG. 13, to move in a downward clockwise direction, lowering the magazine onto the conveyor 116 (FIG. 14). The coacting arms 103 cause a paralleled downward movement. The conveyor 116, being mounted on an angle, automatically causes the magazine 30 to move away from the machine onto the production conveyor system C.

After the magazine has cleared the mechanism 26, the cylinder 111 is again activated by an automatic timing device to move in the reverse direction to restore the roller sets 90 to their original raised position, preparatory to beginning of another cycle of operation.

The Universal Burning Fixtures

Since the two master burning fixtures 17 and 18 used alternately in this machine are substantially identical, it is only necessary to describe one such fixture as is shown in FIGS. 15, 16, 17 and 18. The fixture has a rectangular box-like base 120, a platform 122, and four, two-roller conventional channel-track type roller assemblies 124 which mount the fixture in the channel-shaped rails 15 and 16 for longitudinal movement (FIG. 15). Mounted on the bottom and longitudinally disposed with reference to the fixture is a bar 126, provided with a plurality of equally-spaced freely rotatable rollers 24 disposed for rotation in a horizontal plane. The rollers 24 cooperate with feed cams 19, 20, 21 and 22 mounted on shaft 14 (FIG. 1), the operation of same has already been partly explained but will be described further in detail in the operation of the machine.

Figure 17:
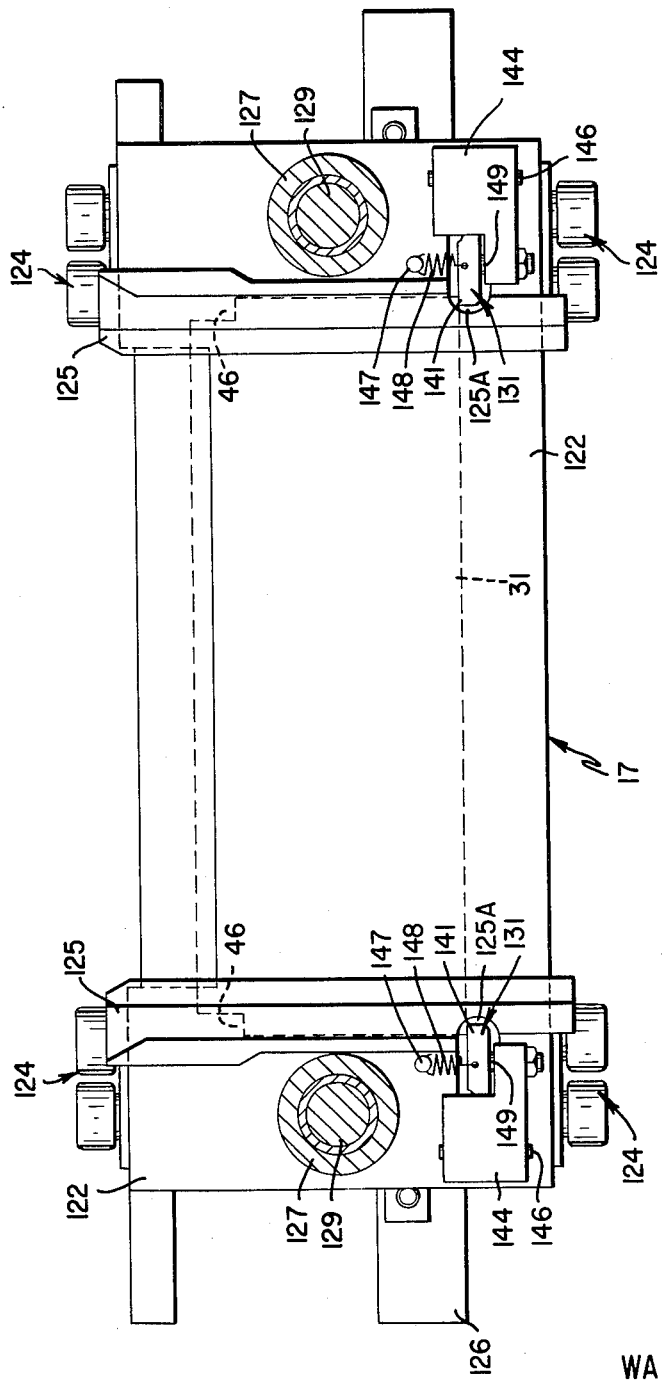

Mounted on the top of fixture base 120 are two identical vertically-disposed bearing sleeves 127, one mounted centrally at each end of the base 120, as shown in FIG. 17. The bearing sleeves 127 house vertically-moving shafts 129 which raise and lower a mold rack mechanism generally indicated at 130. The shafts 129 are actuated in a vertical direction, through a mechanical interlock 129A, by an air-operated cylinder 128 mounted in the machine base 10 by cross bar 128A (FIGS. 19 and 20) to raise (and lower) the mold rack 130 which gives clearance to allow the entry of the magazine 30 into operative position in the fixture by sliding along tracks 125 until stop 131 is contacted.

Figure 19:
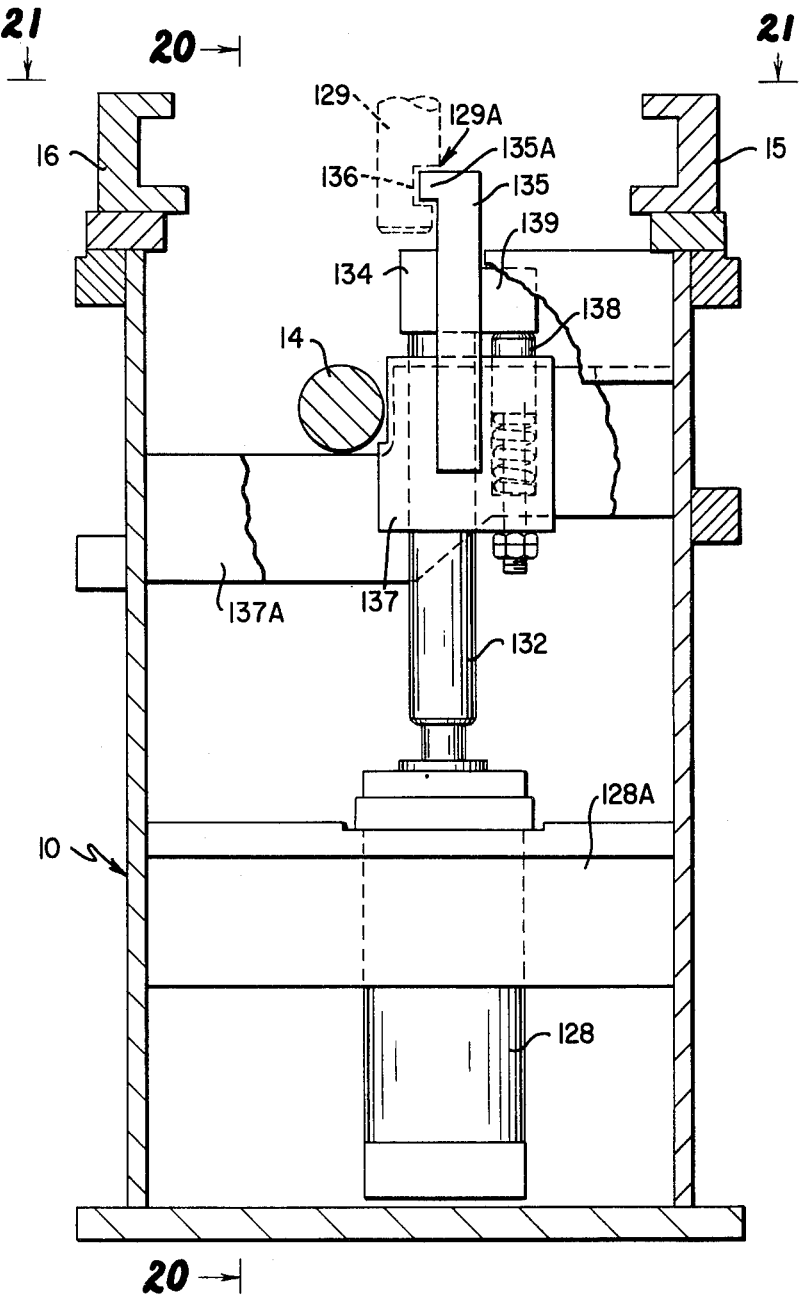
Figure 20:
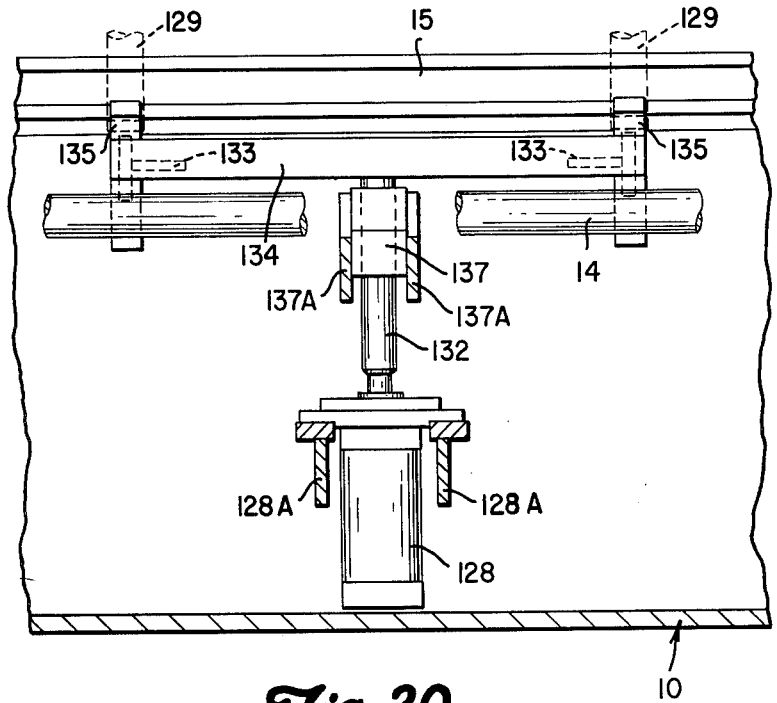
Figure 21:
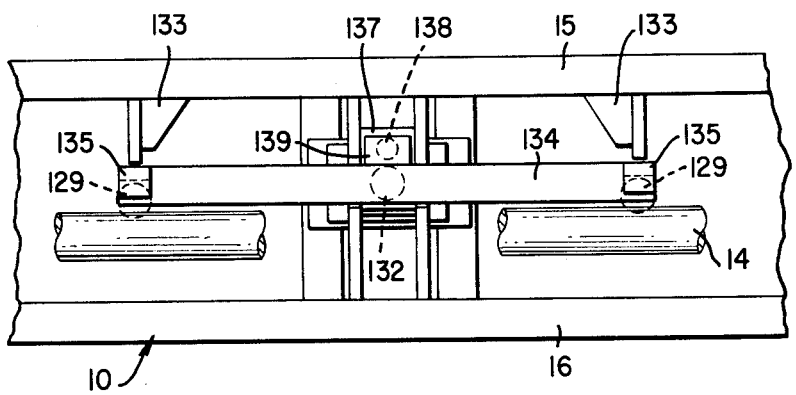

In the operation of the mechanism, when an unprocessed magazine 30 is to be loaded into the fixture 17, the mold rack mechanism 130 must be raised to give sufficient clearance for the magazine to be positioned under it. Referring to FIGS. 19, 20, and 21, to do this, the air cylinder 128 is actuated, the force being transmitted through the vertical piston rod 132 to horizontal bar 134 permanently mounted on the top end of piston rod 132. Each end of bar 134, (FIG. 19) is provided with a vertical bar 135, having a lateral projection 135A cooperating with a horizontal slot 136 provided in the lower end of each of the lift shafts 129 of the rack mechanism 130. A guide block 137, mounted on cross bars 137A affixed on the machine base 10, is provided to guide shaft 132 in its vertical motion. Block 137 is also provided with a spring-urged plunger 138 cooperating with a centrally-located integral projection 139 of bar 134 for the purpose of allowing centering of the projection 135A with the notch 136 to give clearance when relative movement occurs. Guides 133 (FIG. 21) are also provided affixed to the machine base 10 to cooperate with the sides of members 135 for keeping bar 134 and shaft 132 from turning during operation.

When the cylinder 128 is actuated to raise the shafts 129, member 135 will move until its portion 135A contacts the upper surface of slot 136 to raise the mold rack 130 to a predetermined level. In the reverse operation, when the air cylinder 128 is activated on its opposite end, it will lower the rack 130 to a predetermind level compressing the spring-urged plunger 138 in the block 137. After the air pressure is released in the cylinder 128, plunger 138 will return projection 135A, through integrally-connected bar 134 and projection 139, to a central location in slot 136 for the purpose mentioned before. This feature also prevents abutting of shafts 129 and projection 135A when the burning fixtures 17 and 18 are moving from one end of the machine to the other.

The two releasable stop mechanisms 131 for the magazines, already referred to, have the same operating characteristics, so that only one will be described in detail with the same reference numbers being applied to both. The only difference in the two mechanisms, as seen in FIG. 17, is that one is in inverted position with relation to the other. Referring to the details in FIGS. 22 and 23, a combination stop and locating member 141 is shown positioned in a slot 142 provided in a block 144 mounted on platform 122. Member 141 is provided at one end with an enlarged hole 145 loosely fitting on a pivot pin 146 mounted in block 144. Also mounted on platform 122 is a vertical pin 147 providing an anchor for one end of a spring 148, the other end of said spring being connected to the stop member 141 to bias it for limited movement in two planes. Slot 142 in block 144 and hole 145 in member 141 are both made large enough to allow the spring 148 to draw stop member 141 obliquely upward, so that it may move both in a lateral and in a vertical direction. To allow for tolerances of manufacture and wear of the individual parts, an adjustable stop button 149 is provided in block 144 cooperating with stop 141.

Figures 22, 23:
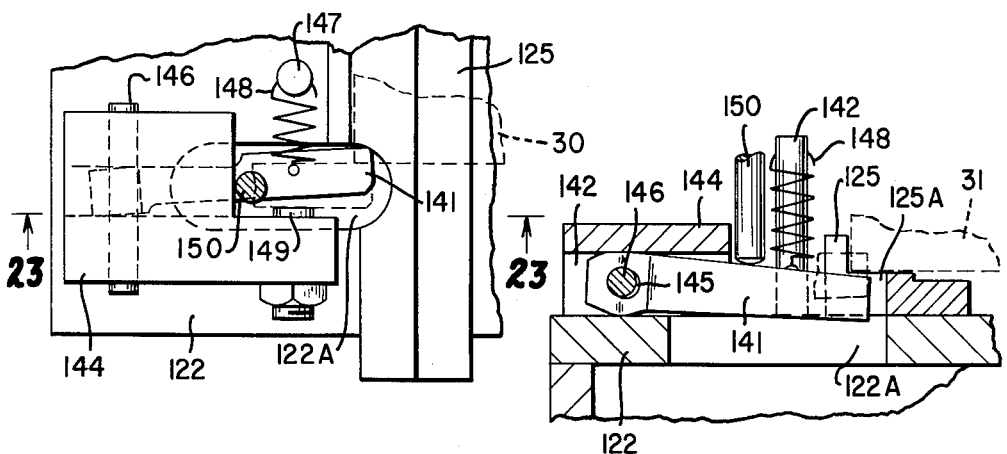

When a magazine is not in position on the platform 122, spring 148 by its oblique bias pulls stop member 141 up above the level of the track 125 into the line of travel of a magazine base 31. As a magazine is pushed into place, base 31 thereof contacts stop member 141 pushing it against limit button 149 to stop said magazine (FIG. 17). Referring to FIGS. 22 and 23, when rack mechanism 130, through the action of cylinder 128, is lowered into operative relation with the plate-loaded magazine, a depending pin 150 mounted on said rack contacts the top of stop 141 pushing it down below the bottom surface of magazine base 31 into clearance slots 125A and 122A provided in track 125 and platform 122. As a result of the loose pivot assembly 146, stop member 141, through the oblique action of spring 148, is pulled laterally to a position under base 31.

Figure 24:
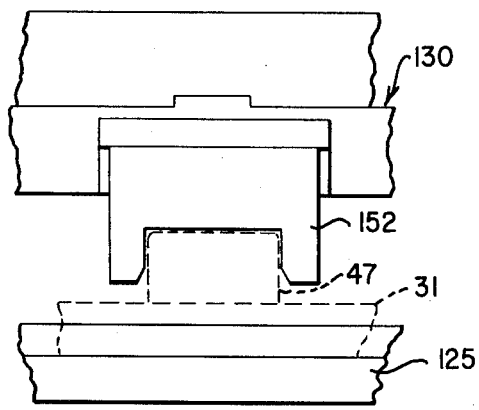

To maintain magazine 30 in its proper position after stop 141 has moved below the base 31, and during the burning process, locking blocks 152, FIGS. 15 and 24 are mounted at each side of rack 130 to cooperate with blocks 47, affixed on the sides of base 31 to lock the magazine in position. Blocks 152 and 47 are engaged at the same time as stop members 141 clear the magazine base 31 when the rack 130 is lowered in operative position. When a processed magazine is pushed out of the machine by a new unprocessed magazine, stop members 141, being held down by base, 31, will snap up through the corner notches 46 of said base and be in position to engage and stop the next magazine entering the machine (FIG. 17).

Figure 16:
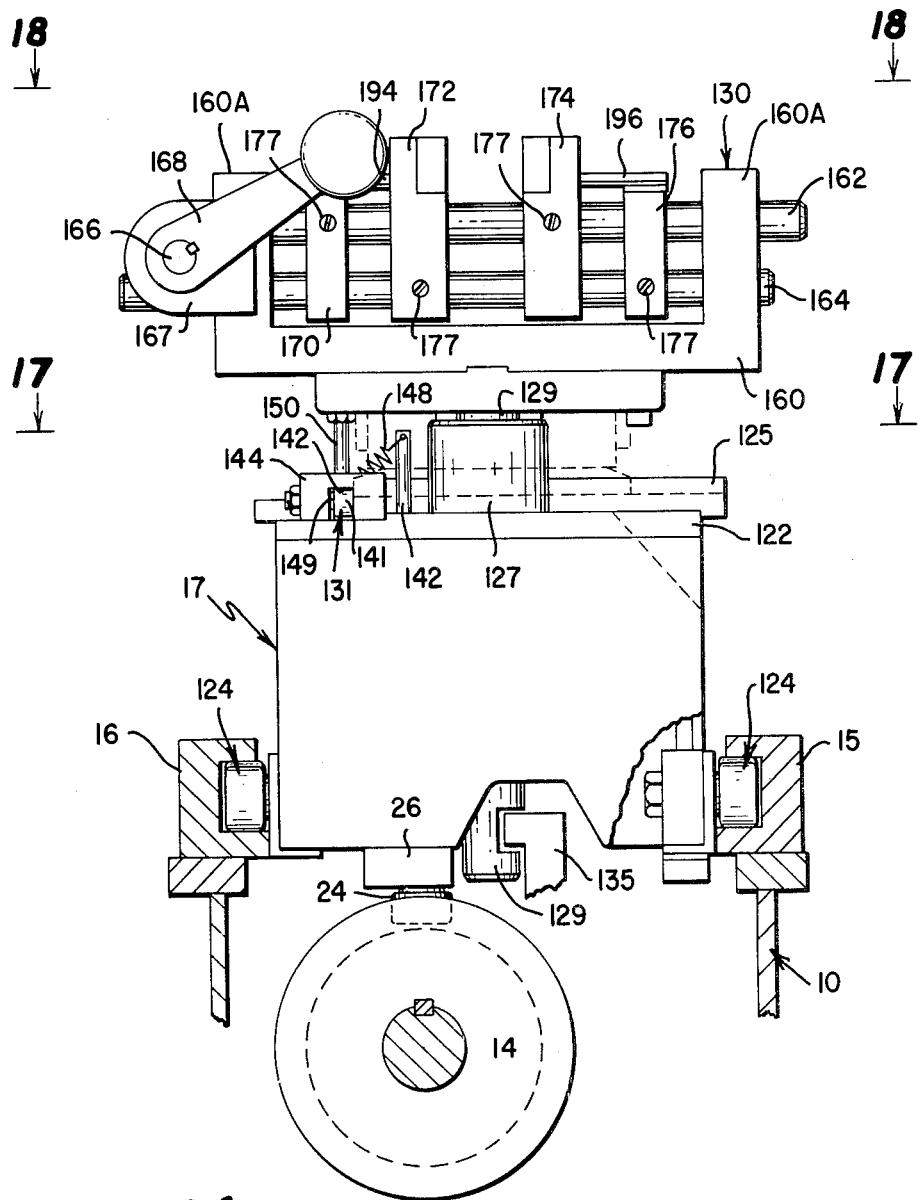
Figure 18:
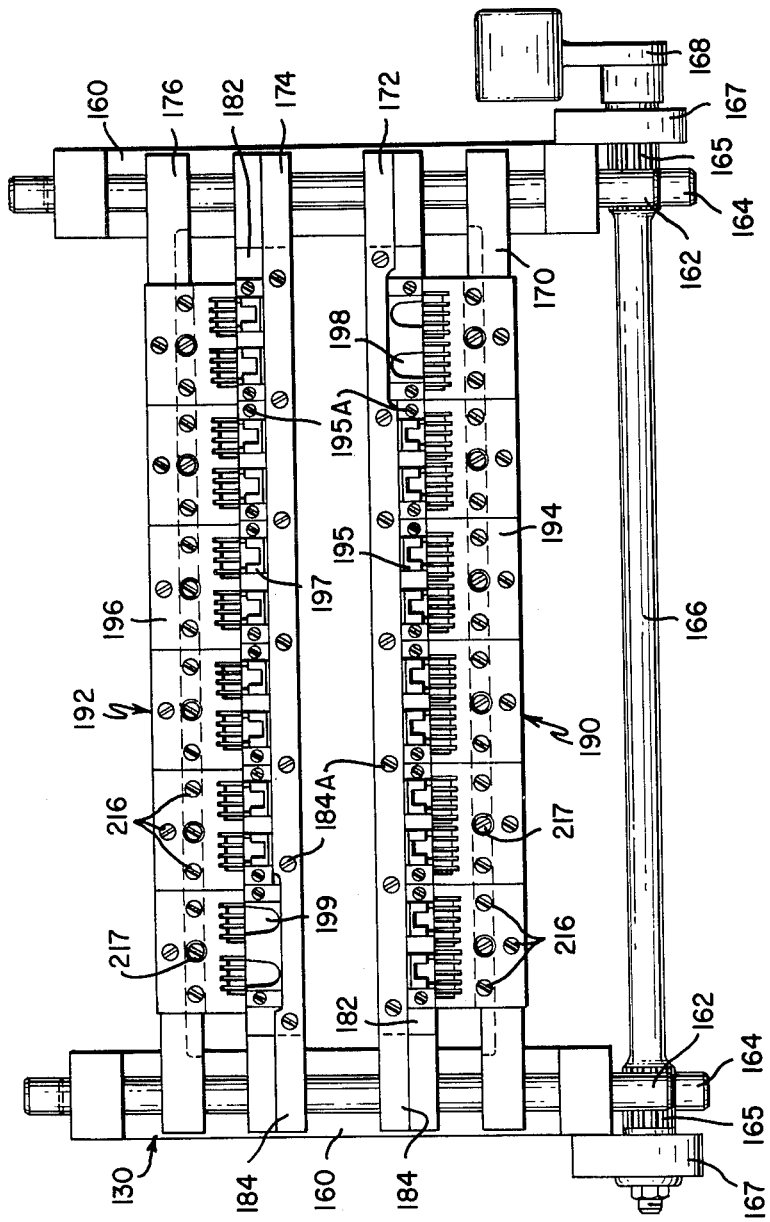

Referring to the upper or rack portion 130 of the burning fixture, as seen in FIGS. 15, 16, and 18, the operation and details of same will now be described. Mounted on top of each of the vertical lift shafts 129 is a transversely-disposed U-shaped member 160, each having a pair of vertically-extending arms 160A, which are each provided with four holes to guide two horizontal, oppositely-sliding rods 162 and 164. Since there are two U-shaped members 160, there will be two identical lower rods 162 and two identical upper rods 164. At one end of each of the rods 162 and 164 a toothed rack is provided which cooperates on opposite sides with pinion gears 165 provided on each end of a shaft 166, the shaft being mounted for rotation in lugs 167 affixed to the arms 160A. When the shaft 166 is rotated, the double rack and single pinion arrangement has the effect of moving the lower set of rods 164 in an opposite direction to the upper set of rods 162. One end of shaft 166 is provided with a weighted crank arm 168 adapted to be operated manually. The only significant difference between the two burning fixtures 17 and 18, as viewed in FIG. 1, is that for convenience of the operator, the fixture 17 has its manually-operated crank arm 168 mounted on the right end of the shaft 166, while the fixture 18 has its crank arm mounted on the left end of the shaft.

Referring to FIGS. 16 and 18, the two sets of spaced rods 162 and 164 have transversely mounted thereon, by suitable apertures, four bars 170, 172, 174 and 176. All of the bars are adjustably mounted at their ends with pins 177 to one of the spaced rods, bars 170 and 174 being affixed to the upper rods 162, and bars 172 and 176 being affixed to the lower rods 164. Each bar is slidably mounted with reference to the other rod to stabilize its movement as controlled by the relative movement between the rods caused by the actuation of the pinion gears 165.

FIG. 28 is an elevational view of either bar 170 having an upper set of holes 186 for affixing to the rod 162 by pins 177 and a lower set of holes 188 for stabilizing the bar on the remaining rod. The bar 176 is similar to the bar 170 except that the pin holes 177A cooperate with the lower set of holes 188 to affix it to rod 164. Bars 170 and 176 are provided for mounting a plurality of comb plate assemblies 194 which will cooperate with the plate lugs and the post-holding means on plate 182 to form a mold assembly.

The general configuration of the bars can be seen in FIGS. 27, 28, 29 and 30. FIG. 27 is an elevational view of bar 172 having a lower set of holes 179 provided for mounting to rod 164 by pins 177 in pin holes 177A, and an upper set of holes providing a stabilizing means on the remaining rod 162 maintaining the bar in a rigid position during operation of the machine. Bar 172 also has a plate 182 removably mounted as by screws 184A to the bottom of a central portion 184 of said bar. Plate 182 is provided to mount a plurality of battery post-holding means 195 (FIG. 39) to retain posts A (FIG. 38) in a definite position. Bar 174 is the same except that the pin holes 177A for attaching it to rod 162 cooperate with the upper set of holes 180, while the lower set of holes 179 act as stabilizers.

Returning to FIG. 18, it can be seen that there are two groups of mold-forming assemblies 190 and 192. Group 190 provides mold-forming means for the negative elements consisting of five-slot comb members 194 mounted on the bar 170 and post-holding means 195 and 198 mounted on the bar 172 above the plate 184, which is attached by screws 184A. In group 192, we have a similar arrangement of parts for the positive elements consisting of four-slot comb members 196 mounted on bar 176 and post-holding means 197 and 199 mounted on bar 174 on the corresponding plate 182, the two groups being mounted in opposite directions to each other. The only difference in the two groups is the number of plates processed since a battery cell element contains one more negative plate than positive plates.

As is well known in the art, a battery has two terminal posts and a number of intermediate posts, the number depending on how many cells are contained in the battery. The terminal posts are larger in diameter than the intermediate posts, and therefore, two different sized post-holding means are provided in each group. Holding means 198 and 199 are provided for the larger terminal posts and holding means 195 and 197 are provided for the intermediate posts. A typical post A and post-holding means 195 are shown in FIGS. 38 and 39.

The post holder 195 is designed to maintain the posts A in a vertical position with reference to the plate elements during burning and solidifying. This prevents posts which have a burr or other imperfection on the bottom surface from causing the post to lean in one direction or another when placed in operative position in the burning rack.

The post holder 195 (FIG. 39) is provided with a vertical channel 193 to partially embrace the post A and a secondary wall portion 191 to cooperate with the flange portion A' of the post. The walls 193 are thick and cut obliquely to serve as flame guards during the burning process which protects the post A from direct exposure to the jet flame, which impinges on the flange portion A', which in melting, supplied the necessary metal to form the joint between the post and the parts of the cell element. By using the specially-designed battery post A having flange portion A' integrally provided thereon, a uniform volume of metal is always supplied to form the joint for the assembled cell element, thereby eliminating human judgment, as is the case when using a burning bar to supply the necessary amount of metal in past battery burning methods.

The post holders 195 are formed with two vertical channels in one piece, which holders are attached to the bars 172 and 174 by screws 195A (FIG. 18). The terminal post holders 199 are similar in construction except that they are larger to fit the large posts required to serve as cell terminals.

Since both groups 190 and 192 are substantially the same except for the number of slots for plates to be processed, only one group will be described in detail. In FIG. 18, group 190 has six cooperating mold assemblies consisting of plate combs 194 and post-holding means 195 and 198. Each molding assembly is designed to provide two mold cavities for two cell elements. To the right of group 190, as viewed in FIG. 18, the larger post-holding means 198 is provided to accommodate two positive terminal posts, the balance of the mold assemblies being provided for intermediate posts 195. Two terminal posts 198 are necessary in each group to supply the necessary elements for two complete batteries.

When the burning fixture 17 (or 18) is in the central position in the machine ready to receive a new unprocessed magazine 30, the mold rack mechanism 130 is in the raised position. Through the manual manipulation of shaft 166 by the operator, including the rods 162 and 164, bar 170 moves the comb members 194 laterally (downwardly in FIG. 18) and moves the post-holding means 194 and 198 mounted on bar 172 in the opposite direction, and bar 176 moves its comb members 196 outwardly (upwardly in FIG. 18) and moves the post-holding means 197 and 199 on bar 174 in the opposite direction. FIG. 35 shows the open position of a portion of the assembly on bars 170 and 172 taken from group 190. When an unprocessed magazine 30 is in position in the burning fixture, the mold rack mechanism 130 is lowered by activation of the air cylinder 128 to a predetermined level as established by the relation of the block 152 engaging member 47 on the magazine 30 (FIG. 24), after which the operator manually rotates weighted crank arm 168 to rotate the shaft 166. This activates the rack and pinion arrangements at the ends of shaft 166 causing bars 170 and 172 to approach each other (FIG. 35) so that the comb members 194 with their slots 200 and post-holding means 195 are brought together in operative relation surrounding the individual negative plate lugs G (FIGS. 36 and 37) to form a mold cavity. A similar action also takes place with reference to the bars 174 and 176 dealing with the positive plate lugs. When the comb members and post-holding means are in closed position, they constitute a group of mold assemblies.

The combs 194 are fabricated of two plates 202 and 203 (FIGS. 31 and 33) providing the essential part of the mold assembly for the burning operation, in that the combs not only hold the plate lugs in proper position but also provide the floor for the mold cavity to retain and mold the molten metal. The upper plate 202 is relatively thick and has two large openings 204 separated by a central projection 205 and bounded on the sides by projections 206 and 207 which form the sides of the mold cavity. The back edge of the openings 204 is provided with slots 208 into which the plate lugs are guided, which also forms a mold side. The tapered areas 209 on the projections 205 and 206 are provided to cooperate with a puddler mechanism to be described hereinafter. Plate 203 (FIG. 33) has a number of fingers 210 separated by slots 200 which embrace the lugs of the plates, the number of each depending on how many plates are to be assembled. The plate 203 is positioned below the plate 202 (FIG. 37) to form a floor for the mold cavity 220, being held in position by suitable bolts 216 and 217. The ends of fingers 210 of the plate 203 are pointed as at 212 to facilitate the entry of the plate lugs G into the slots 200 during closing of the mold assembly, the points 212 also being in alignment and cooperating with notches 214 in plate 182 (FIGS. 35 and 36).

If, at any time, the comb members 194 and 196 are out of alignment with the plate lugs G or become damaged for any reason, they can be adjusted or replaced either individually or as a unit by loosening the screws of the mounting system (FIG. 37). If the entire comb unit must be replaced, only bolts 217 are removed, bolts 216 retaining the comb members in place on plate 213.

*Burning Operation*

Figure 40:
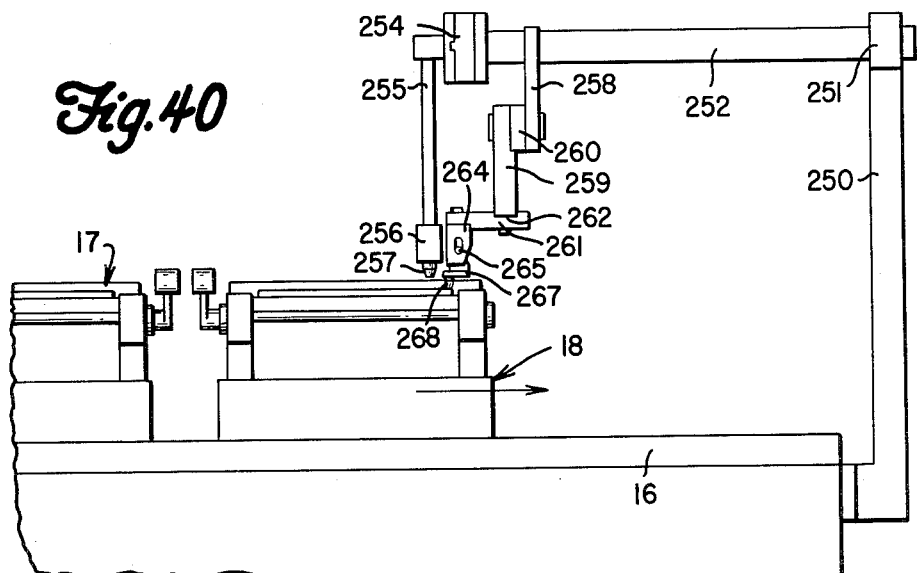
FIG. 40 is an elevational view showing the relative positions of the burner system, the puddler, and the master fixture.
Figures 41, 42:
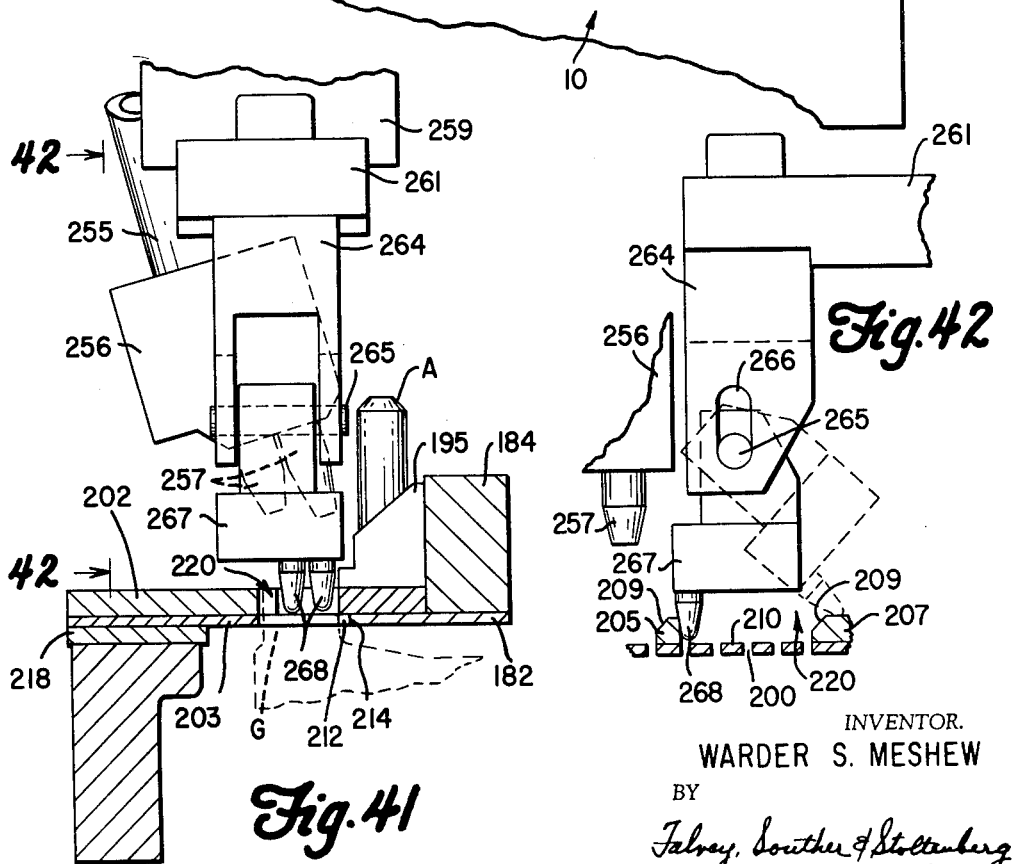
FIG. 41 is a sectional elevation taken through a closed mold assembly showing the relative positions of the burner head and the puddler.
FIG. 42 is an elevational view taken on line 42—42 of FIG. 41.

FIGS. 40, 41 and 42 show schematically the approximate location of the jet burners with relation to the universal burning fixture 18. Mounted to the end of the machine base 10, a vertical support member 250 is provided having a horizontal extension 252 affixed by an adjustable mount 251. The adjustable mount 251 allows the extension 252 to be moved horizontally with relation to the location of the burning fixture 18, which is adapted to move under it propelled by a mechanism already described. The projecting end of the extension is provided with a depending tube 255 having an adjustable mount 254. The adjustable mechanism 254 is for the vertical and horizontal adjustment of a burner head 256 affixed at the lower end of tube 255 while a longitudinal adjustment is made at mount 251. With these adjustments, the burner head 256, with its flame jets 257, can be set to direct the flame jets in the effective area to burn the elements of the battery cell together.

The tube 255 provides the fuel line to feed the burner head 256 and is connected to a suitable source of fuel supply which is not shown. The burner head 256 with its jets 257 is of a standard type and is well known in the art.

A manually preset pressure regulator system is used for the fuel and air lines to the burners, wherein each burner station has its own pressure regulator to provide a uniform volume of fuel at a uniform pressure. To prevent a surge of pressure in either the fuel or air lines, a conventional type breaker station is provided in each of the lines ahead of the station regulators. All of the pressure regulators are preset to a predetermined pressure with the aid of conventional visual gauges provided for each of the regulators. In the past, these pressures have been adjusted manually during each burning operation without the aid of a regulator system which did not produce a uniform melting of the metal parts fused in the burning operation over a period of time. By using a regulator system as described for the air and fuel lines, to the extent that constant human judgment is not relied upon, a uniform burning condition is maintained day after day. Too much pressure will spatter the molten metal about the machine increasing the amount of metal needed to fuse the post and plate assembly. Too little pressure will reduce the heat intensity resulting in the metal not being sufficiently melted so as to flow together consistently to form an integral assembly.

It has been discovered that by agitating the molten metal in the mold cavity during the burning operation, dirt and oxide particles will come to the surface, and, at the same time, the surface tension is minimized causing the molten metal to move around, completely filling the mold cavity 220 and assuming a uniform level therein. Referring to FIGS. 40, 41 and 42, a structure is shown which in addition to the burning means, provides an agitating means to facilitate the burning of dirty or oxidized parts. Depending from the horizontal bar 252, a member 258 is provided, having a vertically-adjustable member 259 depending from a mounting means 260. A horizontally-adjustable bar 261 is mounted to the lower end of member 259 by mounting means 262. Adjustably mounted to member 261, a bifurcated depending block 264 is provided with a vertically-floating pivot pin 265 in a slot 266 in the bifurcated portion of the block 264, on which a puddler block 267 is mounted which has depending projections or fingers 268 which enter the molten metal to effect a puddling or agitating action therein. The size of block 267 is such that it allows gravity to supply the operating force for the puddler system.

Referring particularly to FIG. 42, it can be seen that when the fixture 18 moves to one end of the machine under the jet burners 257, the puddler fingers 268 being positioned immediately behind the jet burners 257, will drag through the mold cavity 220 agitating the molten metal. To insure instant submersion of fingers 268, they are mounted at the forward end of block 267 and eccentric to pivot pin 265; that weight is balanced about the pin so that the fingers 268 hang vertically. Block 267, being rather large, has sufficient weight to force the fingers 268 into the molten metal immediately after crossing members 205, 206 and 207 of plate 202. The pivot pin 265 allows the puddler fingers to pivot freely and ride over members 205, 206 and 207, and the supporting block 267 is mounted at a level to allow the fingers 268 to clear the comb members 210 but low enough to cause effective puddling of the molten metal in the mold 220.

Referring to plate 202 (FIG. 31), and particularly mold assembly group 190 of fixture 17, taper 209 is provided on one edge of members 205 and 206 to facilitate fingers 268 entering the mold cavities immediately after crossing said members. The opposite edges of the mold cavities 204 are not provided with a taper, thereby preventing fingers 268 from dragging molten metal over the edges of members 205 and 207 resulting in an objectionable irregular edge on the finished assembled element. As can readily be seen, the comparable plates for the mold assemblies in group 192 (FIG. 18) have a similar taper 209 on the opposite edges of the mold cavities, which is the leading edge with respect to direction of movement of a mold cavity toward the burner and puddler system. In the case of fixture 18 (FIG. 40), the direction of movement being opposite to fixture 17, a taper similar to taper 209 is provided on all of the opposite edges of comparable plates of the mold assemblies.

The burner and puddler system just described pertains to only half of the mastetr fixture 18, or the negative plate elements. Two systems are provided for each fixture having separate adjustable mountings, one for the positive elements and one for negative elements at each end of the machine. An identical system (not shown) is then mounted to machine base 10 on the other end of the machine, as indicated in FIG. 1.

Summary of Machine Operation

Beginning with the loading operation, the magazine 30, having been loaded by an operator with positive and negative plates with separators, are fed along the conveyor system C, (FIG. 2) where they enter the loading position 25. Cylinder 54 (FIG. 10) is then automatically actuated to push the loaded magazine into a master fixture 17 (or 18) of the machine, the burning rack machanism 130 being in raised position by the activation of cylinder 128. At the same time, the conveyor system C is stopped from feeding other magazines into the loading position 25 by the action of stop 68 (FIG. 12). As soon as the magazine 30 has been loaded into the machine by impinging against stop 141 (FIG. 22), the loading mechanism returns to its original position which releases the stop and allows another magazine to be fed into the loading position 25 preparatory for the next cycle.

After a magazine has been loaded into the machine and stopped in its proper location, the burning rack mechanism 130 of the master fixture 17 (or 18) is lowered in position by activation of the cylinder 128 (FIG. 2), the magazine and burning rack mechanism being interlocked and held in relative operation position by the cooperation of blocks 47 and 152 (FIG. 24).

With the burning rack mechanism 130 in operative position with reference to the magazine, an operator manually actuates crank arm 168 to close the elements of the mold assembly (FIG. 36), causing the elements of the mold assembly to surround the upper end portions of the plate lugs G to form a mold chamber 220. The operator then places suitable precast battery posts in the post-holding means (195, and 198, 197 and 199), also mounted on mechanism 130, and the master fixture with its magazine is ready for processing in the burning cycle, wherein the magazine and its superposed master fixture moves laterally on the rails 15 and 16 to pass under the burning jets and the puddlers.

By the time the operator has finished positioning the posts in their holders, the newly loaded fixture is being moved out of loading position and the second fixture is being moved back into the central loading or unloading position, after having passed through its burning cycle. Shaft 14 with its rotating cams 19, 20, 21 and 22 provides the motive means to move the master fixtures along the rails 15 and 16 both outwardly and inwardly automatically, and at a given location, allow one of the fixtures to remain idle for a given length of time. Rollers 24, provided on the bottom of the master fixtures, cooperate with the threaded cams 19, 20, 21 and 22 to mechanically control the movements of the fixtures. When fixture 18 is moved out of loading position, fixture 17 is moved already processed back into the central unloading (or loading) position and stopped.

While fixture 18 with its loaded magazine 30 is being moved across the machine on the rails under the burning jets and puddling fingers, fixture 17 is being unloaded at the central location by having its processed magazine moved from it by a new unprocessed magazine moving into position in the fixture. The processed magazine moves to the conveyor portion 26 from the fixture 17 while the unprocessed magazine moves from the conveyor portion 25 into the fixture (FIG. 2). As fixture 18 moves to the end of its travel, a switch LS–10 (FIG. 43) is actuated automatically reversing the rotation of the motor 11 and the shaft 14. Fixture 18 is then moved in the opposite direction by cam 22 and rollers 24 until cam 21 engages a roller 24 taking over the movement of said fixture. Cams 21 and 22 are spaced, so that when cam 21 engages the first roller 24, cam 22 disengages the last roller 24, allowing the cam to rotate clear of fixture 18.

As cam 21 moves fixture 18 on its return travel, the fixture will push fixture 17, which has been loaded with a new magazine and supplied with posts by the operator, until cam 20 engages a roller 24 of the fixture. Cams 20 and 21, having the same thread-like configuration, cause both fixtures 17 and 18 to move across the machine on the rails in unison for a given distance. Fixture 18 will continue to travel until cam 21 disengages the last roller 24 placing the fixture directly between cams 20 and 21 in the central loading and unloading position. Fixture 18 will remain in this position until fixture 17 returns to again start another cycle.

Cam 20 will move fixture 17 until cam 19 engages a roller 24, at which time cam 20 disengages the last roller of the fixture. Cam 19 will then move fixture 17 through its burning and puddling cycle until another switch LS–11 (FIG. 43) is automatically actuated again reversing the rotation of the motor 11 and the shaft 14. Fixture 17 will then return to the central loading and unloading position of the machine to push fixture 18 into engagement with cam 21 to begin another cycle of operation.

Figure 25:
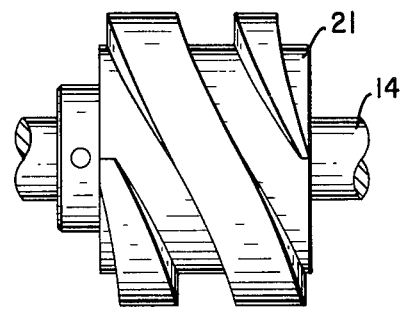
Figure 26:
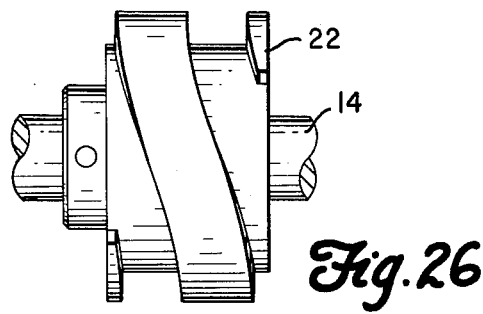

Referring to FIGS. 25 and 26, the thread-like cams are of two types since they perform two different operations. Cams 20 and 21 are identical and cams 19 and 22 are identical. Therefore, one of each only will be referred to, specifically cams 21 and 22. Cam 21 (FIG. 25) may be described as a rapid traverse cam having a greater pitch since it moves fixture 18 faster than cam 22 which has a smaller pitch (FIG. 26). Cam 22 may be described as a feed cam inasmuch as it feeds fixture 18 through the burning process in the outward direction and returns the fixture in the opposite direction toward the central location.

When moving a fixture through the burning process, it is desirable to move the fixture slow enough in the outward direction to allow complete melting and fusion of the metal in the cell plate lugs G and the flange A' of the posts A.

As the fixtures 17 and 18 move outwardly they contact the actuating lever of switches LS–14 and LS–13 respectively, which control solenoid valves (not shown) in the respective fuel lines of the jet burners 257 at the ends of the rails, to cause the burners to ignite to perform the melting and fusing of the metal in the respective parts, the fusion of the metal being assisted by the puddler fingers 268. On the return of the respective fixture, the switches LS–14 and LS–13 are again actuated by contact with the fixture moving in the opposite direction to shut off the fuel supply to extinguish the burners. It is also necessary to return the processed fixture slow enough toward the central location for the molten metal to solidify in the molds 220 before reaching the unloading position. Since cams 20 and 21 are adjacent the central location, they are designed to move the master fixtures at a faster rate, giving the operator more time to prepare a fixture for burning at the loading position.

After the magazines 30 and the fixtures have gone through the burning process and have returned to central position, the magazines are pushed out of the fixtures by incoming magazine onto the conveyor portion mechanism 26. Cylinder 111 is then automatically actuated to initiate the travel of the magazines onto the assembly line conveyor system C for further steps in processing.

Figure 45:
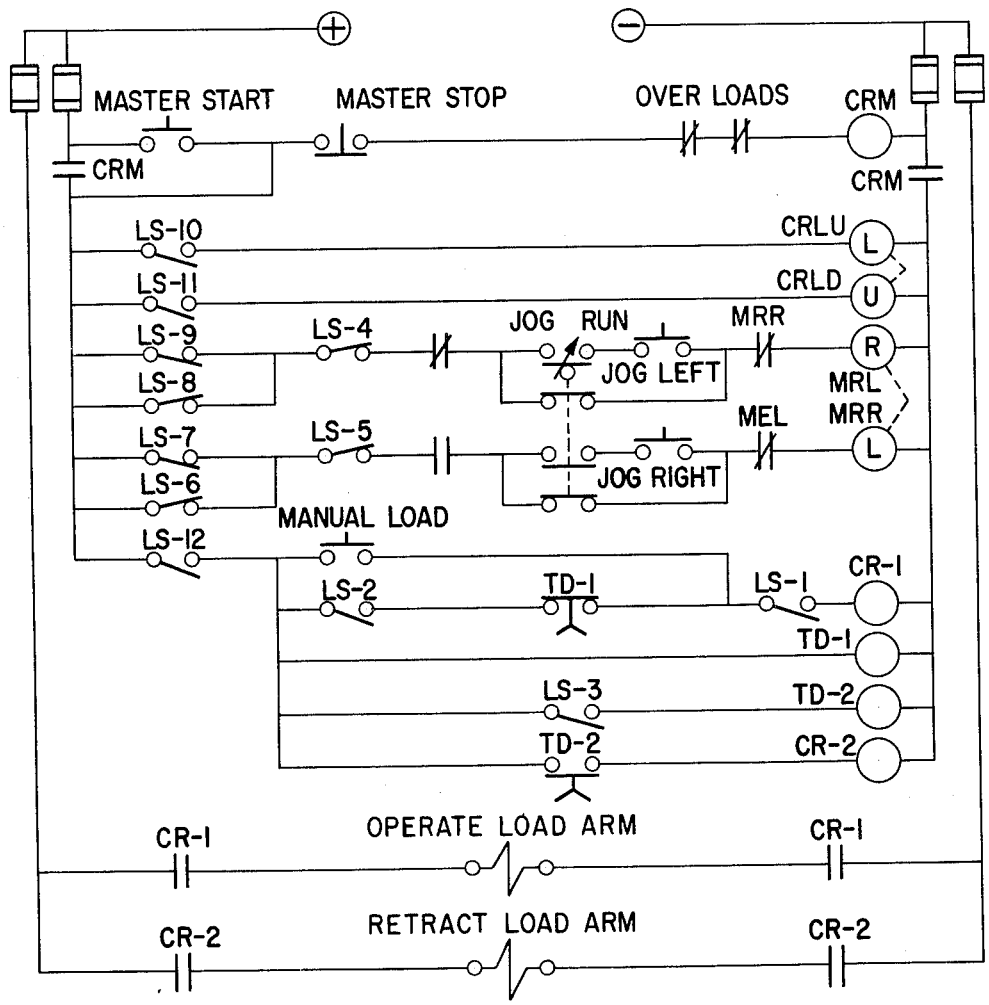
FIG. 45 is a schematic wiring diagram of the automatic of the automatic electrical system used.

FIGS. 43, 44 and 45 diagrammatically show the automatic electrical system of the machine with a descriptive list of the switches utilized. Since the system uses conventional electrical components found well known in the art, this description will be readily understood by anyone experienced in the art, and, therefore, will not be described in detail.

It is to be understood that the above-detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond requirements of the prior art.

What is claimed:

1. In a method for uniting a metal battery post to metal lugs of battery plates to provide a battery element which method comprises securing said lugs and said post in position for fusing within removable mold means thereby providing a battery element forming assembly, applying to said lugs and said post heat sufficient to cause melting and belnding thereof within said mold means, the improvement which comprises causing reciprocating movement of said assembly between a first terminal posiiton within a cooling zone and a second terminal position within a heating zone having heat generating means positioned therein, and in the course of said reciprocating movement causing said assembly to move into effective heating distance of said heat generating means, melting at least a portion of said post with heat generated by said heat generating means thereby forming molten metal within said mold means, agitating said molten metal within said heating zone with agitation means as said assembly moves through said heating zone, and moving said assembly out of effective heating distance of said heat generating means.

2. In a method for uniting a lead comprising battery post to lead comprising lugs of battery plates to provide an integrally formed battery element which comprises securing said lugs and said post in position for fusing within removable mold means thereby providing a battery element forming assembly, applying to said lugs and said post heat sufficient to cause melting and blending thereof within said mold means, and cooling the resulting molten blend until solidification thereof, the improvement which comprises causing timed reciprocating movement of said assembly between a first terminal position within a cooling zone and a second terminal position within a heating zone having positioned therein heat generating means and agitation means cooperating with said heat generating means, said agitation means being positioned and arranged to contact molten metal within said mold means as said assembly moves through said heating zone, and in the course of said reciprocating movement causing said assembly to move into effective heating distance of said heat generating means, melting said lugs and said post with heat generated by said heat generating means thereby providing molten metal within said mold means, contacting said molten metal with said agitation means, and moving said assembly out of said heating zone and into said cooling zone.

3. In a method for uniting a lead comprising battery post to lead comprising lugs projecting from battery plates to provide an integrally formed battery element which comprises securing said post and said plates with accompanying plate separators in position for fusing of said lugs and said post within a removable mold thereby providing a battery element forming assembly, applying to said lugs and said post heat sufficient to cause melting and blending thereof within said mold forming means, and cooling the resulting molten blend until solidification thereof, the improvement which comprises causing timed reciprocating movement of said assembly between a first terminal position within a cooling zone and a second terminal position within a heating zone having heat generating means and agitation means located therein, said agitation means being positioned and arranged to pass into said mold forming means as said assembly moves through said heating zone, and in the course of said reciprocating movement causing said assembly to move into effective heating distance of said heat generating means, melting said lugs and said post with heat generated by said heat generating means thereby providing molten metal within said mold forming means, contacting said molten metal within said mold forming means with said agitation means and moving said assembly out of said heating zone.

4. In a method for uniting a lead comprising battery post to lead comprising lugs on battery plates to provide an integrally formed battery element which comprises securing said lugs and said post in position for fusing within removable mold forming means thereby providing a battery element forming assembly, applying to said lugs and said post heat sufficient to cause melting and blending thereof within said mold forming means, and cooling the resulting molten blend until solidification thereof, the improvement which comprises causing timed reciprocating movement of said assembly between a first terminal position within a cooling zone and a second terminal position within a heating zone having heat generating means and agitation means positioned therein, said heat generating means comprising a jet burning means, said agitation means being positioned and arranged to enter said mold means as said assembly moves through said heating zone, and in the course of said reciprocating movement causing said assembly to move under and into effective heating distance of said jet burning means, melting said lugs and said post with heat generated by said jet burning means thereby providing molten metal within said mold means, contacting said molten metal within said mold means with said agitation means, and moving said assembly out of said heating zone, the burning associated with said jet burning means being initiated as said assembly enters said heating zone and extinguished as said assembly leaves the same.

5. In a method for uniting lead comprising battery posts to lead comprising lugs of battery plates to provide integrally formed battery elements which method comprises securing said posts and said lugs in position for fusing within removable mold means thereby providing a battery element forming feed assembly, applying to said lugs and said posts heat sufficient to cause melting and blending thereof within said mold means, and reducing the temperature of the resulting blend until solidification thereof, the improvement which comprises causing a first feed assembly and a second feed assembly to move simultaneously along a line extending from a first terminal position in a first heating zone having heat generating means therein through a central loading position and to a second terminal position within a second heating zone having heat generating means therein, said first feed assembly and said second feed assembly being spaced apart with a distance maintained between the centers thereof substantially equal to one half the distance between said terminal positions so that when one such assembly is positioned at one of the terminal positions the other is positioned at said central loading position, in the course of said reciprocating movement alternately moving each such feed assembly into the corresponding heating zone and into effective heating distance of the heat generating means therein, melting and blending the lugs and posts thereof within the mold means therein, causing agitation of the resulting molten metal before removal from said corresponding heating zone, returning the resulting fused assembly to said central loading position, and replacing said fused assembly on said line with a feed assembly.

6. In a method for uniting lead comprising battery posts with lead comprising lugs of battery plates to provide integrally formed battery elements which method comprises securing said lugs and said posts in position for fusing within mold means, applying to said lugs and said posts heat sufficient to cause melting and blending thereof within said mold means, and cooling the resulting molten blend until solidification thereof forms said battery elements, the improvement which comprises moving feed assemblies of said plates and said posts into mold forming battery element holders in a central loading and unloading position between heat generating jet burners positioned on opposite sides of and equidistant from said central position in a first burning zone and a second burning zone respectively, causing two of said holders spaced apart a distance equal to the distance between said central position and the burning zones to move together in timed reciprocating movement wherein the movement of one of said holders into said central position simultaneously moves the other into the corresponding burning zone, and in the course of said reciprocating movement causing one such holder to move within effective heating distance of the jet burner in said first burning zone, melting the lugs and posts situated within the mold therein, moving the resulting molten material in such mold into contact with stationary fingerlike agitators thereby agitating said molten material, moving the resulting fused assembly and its holder from said first burning zone to said central position and said second feed assembly with its holder into said second burning zone, replacing said fused assembly with a feed assembly, subjecting said second feed assembly to the same treating steps to which said first feed assembly was subjected in said first burning zone and returning the resulting second fused assembly to said central position.

7. In a battery burning machine the combination of a base, track means supported by said base and providing intermediate of the ends thereof a central loading and unloading position between burning positions situated below a first heat generating means and a second heat generating means supported by said base, a pair of battery assembly holding fixtures movably mounted in line upon said track means, fixedly positioned in relation to each other, and constructed and arranged such that when one of said fixtures occupies said central position the other occupies the corresponding burning position, each of said fixtures comprising mold means constructed and arranged to receive, releasably retain, and position for fusing battery plates and battery posts, and transfer means constructed and arranged to move said fixtures in timed reciprocating movement along said rails for a distance sufficient to alternately move each of said fixtures under the corresponding heat generating means and alternately into said central position, each of said heat generating means being adapted to melt said plates and said posts when said plates and said posts are in the corresponding burning position.

8. In a battery burning machine the combination of a base, track means supported by said base and providing intermediate of the ends thereof a central loading and unloading position between burning positions situated below a first heat generating means and a second heat generating means supported by said base, a pair of battery assembly molding fixtures movably mounted in line upon said track means, fixedly positioned in relation to each other, and constructed and arranged such that when one of said fixtures occupies said central position the other occupies the corresponding burning position, each of said fixtures comprising mold means constructed and arranged to receive, releasably retain, and position for fusing battery plates and battery posts, transfer means constructed and arranged to move said fixtures in timed reciprocating movement along said rails for a distance sufficient to alternately move each of said fixtures under the corresponding heat genearting means and alternately into said central position, and agitation means supported by said base, positioned in each of said burning positions, and adapted to enter the mold means of a fixture entering the burning position, each of said heat generating means being adapted to melt said plates and said posts when said plates and the corresponding posts are in said burning position.

9. In a machine for burning battery posts to the upstanding lugs of plates to form a battery cell element, a base for the machine including a pair of parallel horizontal rails extending laterally on either side of a central position to opposed burning positions, conveyors attached in part to the base cooperating with the rails at the central position, a plurality of magazines movable on the conveyors to and from the central position adapted to be preloaded with plates and separators forming the battery cell element, a pair of universal master fixtures movable on the rails and adapted to hold said magazines and to occupy the central position alternately, means on the base to move the preloaded magazines to and from the conveyors and to and from the central position of the machine where they are loaded and unloaded into and from the master fixture an unprocessed and processed magazines, mold forming comb means movably mounted on the fixtures including means to hold precast posts when positioned therin in fusing position with the upstanding lugs of the plates, said comb and post holder means forming a mold means for said posts and the lugs of said plates, jet burners mounted on the base constructed and arranged to perform a burning operation in said burning positions on the lugs and posts and to unite the same by melting a portion of each into said mold means, transfer means associated with the base to reciprocate the magazine loaded fixtures along the rails in timed relation under said burners and to return the processed magazine loaded fixtures to said central position for unloading, and fixed means including fingers pivotably mounted thereon supported by said base and positioned and arranged to cooperate with said burners and agitate molten material in the mold means of a fixture as it moves within either of said burning positions.

10. In a battery burning machine the combination of track means providing intermediate of the ends thereof a central loading and unloading position between a first burning position and a second burning position, a first heat generating means positioned, constructed and arranged to generate heat in said first burning position, a second heat generating means positioned, constructed and arranged to generate heat in said second burning position, a pair of battery assembly holding fixtures movably mounted in line upon said track means, fixedly positioned in relation to each other, and constructed and arranged such that when one of said fixtures occupies said central position the other occupies the corresponding burning position, each of said fixtures being constructed and arranged to receive and releasably retain an assembly of battery forming elements including a battery plate and a battery post arranged for fusing, and transfer means constructed and arranged to cause said fixtures to reciprocate along said rails for a distance sufficient to alternately move each of said fixtures into the corresponding burning position and alternately into said central position, each of said heat generating means being adapted to at least partially melt said plate and said post for fusing when said plate and said post are in the corresponding burning position.

11. In a battery burning machine the combination of track means providing intermediate of the ends thereof a central loading and unloading position between a first burning position and a second burning position, a first heat generating means positioned, constructed and arranged to generate heat in said first burning position, a second heat generating means positioned, constructed and arranged to generate heat in said second burning position, a pair of battery assembly holding fixtures movably mounted in line upon said track means, fixedly positioned in relation to each other, and constructed and arranged such that when one of said fixtures occupies said central position the other occupies the corresponding burning position, each of said fixtures being constructed and arranged to receive and releasably retain an assembly of battery forming elements including a battery plate and a battery post arranged and positioned for fusing, transfer means constructed and arranged to move said fixtures in timed reciprocating movement along said rails for a distance sufficient to alternately move each of said fixtures under the corresponding heat generating means and alternately into said central position, each of said heat generating means being adapted to at least partially melt said plate and said post for fusing when said plate and said post are in the corresponding burning position, and agitation means within each of said burning positions constructed and arranged to agitate molten metal formed within the fixture within such burning position by the corresponding heat generating means and the assembly of battery components within the fixture.

References Cited in the file of this patent

UNITED STATES PATENTS

| 1,775,859 | Hultgren | Sept. 16, 1930 |
| 1,916,042 | Edgar | June 27, 1933 |
| 1,960,195 | Nyce | May 22, 1934 |
| 2,128,316 | Paul | Aug. 30, 1938 |
| 2,241,344 | Graham | May 6, 1941 |
| 2,410,694 | Tyler | Nov. 5, 1946 |
| 2,429,525 | Rawlinson et al. | Oct. 21, 1947 |
| 2,430,188 | Sargent | Nov. 4, 1947 |
| 2,609,776 | Sahlin | Sept. 9, 1952 |
| 2,664,842 | Lormor | Jan. 5, 1954 |
| 2,756,708 | Tiegel | July 31, 1956 |
| 2,786,433 | Vieth | Mar. 26, 1957 |
| 2,843,072 | Winkel et al. | July 15, 1958 |

FOREIGN PATENTS

| 349,410 | Great Britain | May 28, 1931 |
| 563,701 | Great Britain | Aug. 28, 1944 |